United States Patent
Dominic

(10) Patent No.: US 11,208,151 B2
(45) Date of Patent: Dec. 28, 2021

(54) PILLAR APPARATUS FOR USE WITH VEHICLES

(71) Applicant: Toyota Motor Engineering & Manufacturing North America, Inc., Plano, TX (US)

(72) Inventor: Justin E. Dominic, Milan, MI (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 0 days.

(21) Appl. No.: 16/751,812

(22) Filed: Jan. 24, 2020

(65) Prior Publication Data

US 2021/0229747 A1 Jul. 29, 2021

(51) Int. Cl.
| | |
|---|---|
| *B62D 25/02* | (2006.01) |
| *B62D 21/15* | (2006.01) |
| *B62D 25/04* | (2006.01) |
| *B62D 27/02* | (2006.01) |
| *B62D 25/06* | (2006.01) |

(52) U.S. Cl.
CPC ........... *B62D 25/02* (2013.01); *B62D 21/157* (2013.01); *B62D 25/04* (2013.01); *B62D 25/06* (2013.01); *B62D 27/02* (2013.01)

(58) Field of Classification Search
CPC ....... B62D 25/02; B62D 25/04; B62D 21/157
USPC .......................... 296/203.01, 203.03, 193.06
See application file for complete search history.

(56) References Cited

U.S. PATENT DOCUMENTS

| | | | |
|---|---|---|---|
| 6,817,654 B2 | 11/2004 | Kitagawa et al. | |
| 6,983,981 B2 | 1/2006 | Saeki | |
| 8,480,163 B2 | 7/2013 | Mori | |
| 8,894,131 B2 | 11/2014 | Mori | |
| 9,156,505 B2 | 10/2015 | Yao et al. | |
| 9,643,655 B2 * | 5/2017 | Saito ...................... | B62D 25/06 |
| 2018/0170444 A1 | 6/2018 | Nakamoto et al. | |
| 2019/0031242 A1 * | 1/2019 | Takii ...................... | B62D 25/02 |
| 2019/0144043 A1 | 5/2019 | Inamoto et al. | |
| 2019/0168812 A1 | 6/2019 | Yamazaki et al. | |

FOREIGN PATENT DOCUMENTS

| | | |
|---|---|---|
| JP | 2009-126241 A | 6/2009 |
| JP | 2011-195110 A | 6/2011 |

* cited by examiner

*Primary Examiner* — Dennis H Pedder
(74) *Attorney, Agent, or Firm* — Oblon, McClelland, Maier & Neustadt, L.L.P.

(57) ABSTRACT

Pillar apparatus for use with vehicles are disclosed. A disclosed vehicle includes a roof and a roof side rail including an inner panel that extends along a side of the roof. The vehicle also includes a pillar having an outer panel that extends along the side of the roof and is coupled between the roof and the inner panel. The pillar includes a structural feature positioned on the outer panel. The structural feature is configured to cause the outer panel to form a bend that distributes a first load onto an area of the inner panel to prevent the inner panel from tearing during a first vehicle impact event in which the first load is imparted on the outer panel.

18 Claims, 16 Drawing Sheets

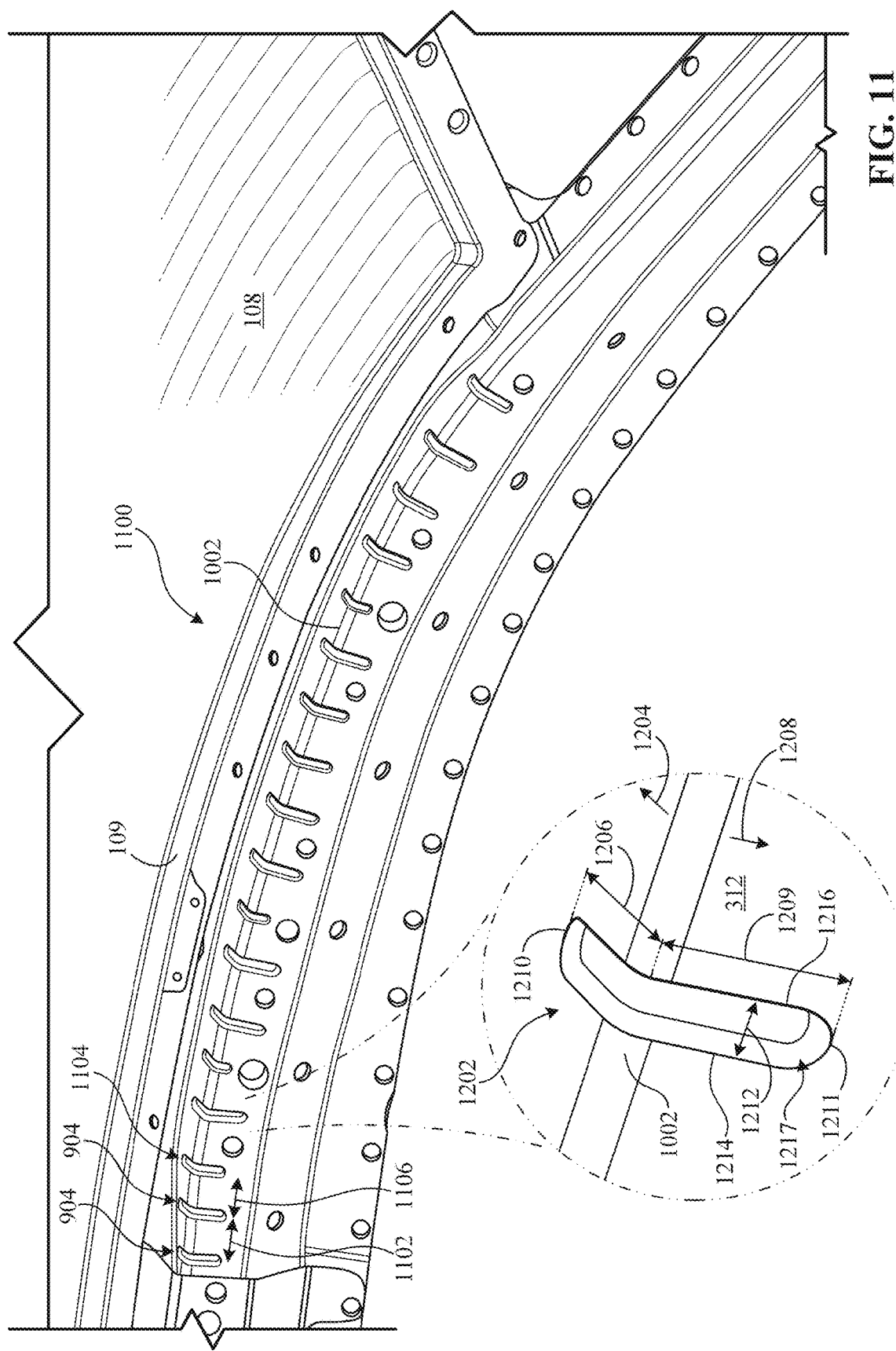

US 11,208,151 B2

PILLAR APPARATUS FOR USE WITH VEHICLES

FIELD OF THE DISCLOSURE

This disclosure relates generally to vehicles and, more particularly, to pillar apparatus for use with vehicles.

BACKGROUND

Motor vehicles typically employ metal panels to improve strength and/or rigidity of vehicle body components such as pillars, rails, etc. Often, automotive manufactures perform controlled crash tests to ensure the vehicle body components properly deform in a manner that would keep vehicle occupants safe during a real-world collision.

SUMMARY

An example vehicle includes a roof and a roof side rail including an inner panel that extends along a side of the roof. The vehicle also includes a pillar having an outer panel that extends along the side of the roof and is coupled between the roof and the inner panel. The pillar includes a structural feature positioned on the outer panel. The structural feature is configured to cause the outer panel to form a bend that distributes a first load onto an area of the inner panel to prevent the inner panel from tearing during a first vehicle impact event in which the first load is imparted on the outer panel.

An example pillar for a vehicle includes a first segment partially forming a roof side rail of the vehicle that is configured to provide support to a vehicle roof. The first segment is configured to bend when a load is applied to the first segment during a first vehicle impact event. The pillar also includes a second segment connected to the first segment and extending away from the first segment along a window of the vehicle. The pillar also includes a structural feature positioned in the first segment. The structural feature is configured to collapse while the first segment is bending to increase a bend radius associated with the first segment.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein:

FIG. 11 is a detailed view of an example panel of an example pillar and shows example spacing associated with at least some example structural features in accordance with the teachings of this disclosure;

FIG. 12 is an enlarged portion-view of the example panel of FIG. 11 and shows an example structural feature in accordance with the teachings of this disclosure;

In general, the same reference numbers will be used throughout the drawing(s) and accompanying written description to refer to the same or like parts.

DETAILED DESCRIPTION

Figure 1:
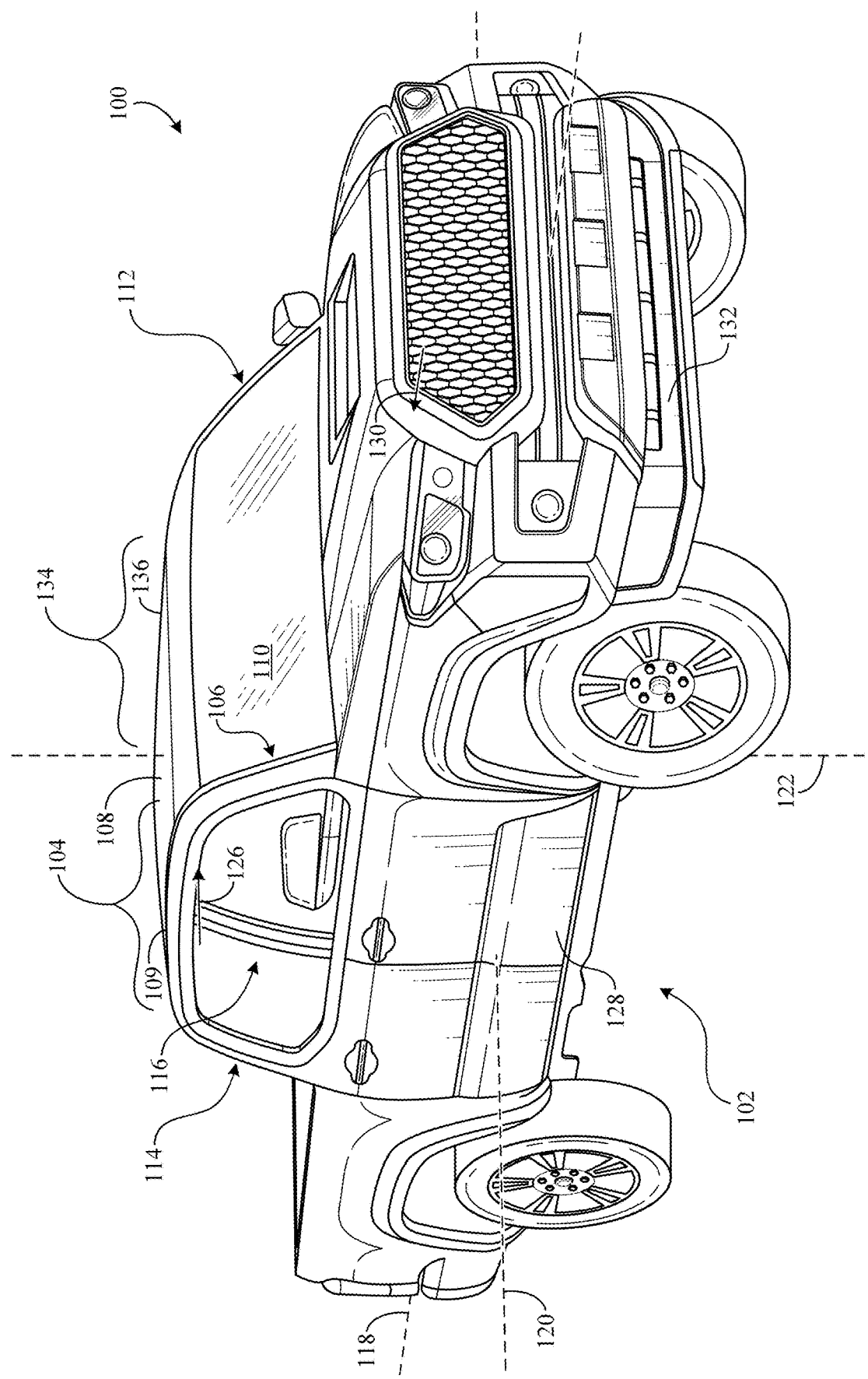
FIG. 1 is a view of an example vehicle in which examples disclosed herein can be implemented.

Vehicles typically include roof side rails to provide support and/or structural integrity to a roof of a vehicle. Such a roof side rail may include a known inner panel coupled to a known outer panel of an A-Pillar that extends away from the roof side rail to provide support to a vehicle windshield. During a pole side impact test in which the vehicle is pushed into a vertical pole at a predetermined velocity, the pole may cause at least a portion (e.g., the inner panel) of the roof side rail to tear due to a deformation mode associated with the roof side rail or the way in which the roof side rail bends around the pole. For example, when the outer panel of the roof side rail impacts the pole, the outer panel may begin to bend around the pole such that a portion of the outer panel forms small radius bend. This small radius bend of the outer panel, when urged into engagement with the inner panel, may tear the inner panel.

To protect nearby vehicle components (e.g., safety components such as curtain shield airbags) from sharp or jagged edge(s) that may be formed by the inner panel during such a vehicle collision, some vehicles may include a known plastic cover extending over the inner panel. The known plastic cover prevents the sharp or jagged edge(s) of the inner panel from contacting and/or damaging the nearby vehicle components, thereby improving vehicle safety. However, implementing these known plastic covers in a known roof side rail increases costs and/or time associated with producing the roof side rail. Additionally or alternatively, the inner panel of the roof side rail is sometimes implemented with relatively small holes that are positioned on the inner panel in particular areas where the tear is predicted to occur, which substantially prevents the tear from propagating through the inner panel. However, such known plastic covers and/or holes (collectively referred to hereinafter as known vehicle body safety features) do not prevent tearing from occurring. Instead, these known vehicle body safety features attempt to prevent damage typically caused by the sharp or jagged edge(s) of the inner panel. Further, in some vehicle applications, a desired coverage area of the inner panel is too large for these known plastic covers, and too many possible tear locations exist in the desired coverage area for these known holes to be effective.

Pillar apparatus for use with vehicles are disclosed. Examples disclosed herein provide an example roof side rail of a vehicle and an example pillar (e.g., an end pillar such as an A-Pillar) of the vehicle that is connected to the roof side rail. The disclosed pillar includes a first example panel (e.g., an A-Pillar outer panel), and the disclosed roof side rail includes a second example panel (e.g., a rail inner panel) coupled to the first panel. The disclosed pillar includes a first segment at least partially overlapping with a roof of the vehicle and/or at least partially forming the roof side rail. The disclosed pillar also includes a second segment connected to the first segment and extending away from the first segment along a window (e.g., a windshield) of the vehicle to support the window. Examples disclosed herein also provide one or more example structural features (e.g., beads) that are particularly sized, shaped, and/or positioned on a portion (e.g., an outer top ridgeline) of the first panel of the pillar in the first segment. In particular, when a certain object or structure (e.g., a pole) impacts the first segment of the pillar (e.g., during a side crash pole impact test), the disclosed structural feature(s) is/are configured to cause the first panel to form a substantially continuous, large radius bend that contacts a relatively large area of the second panel, for example, regardless of a location at which the structure impacts the first segment of the pillar. In some examples, the structure applies a first target load to a side of the first panel such as, for example, a compressive side load that is at or above a threshold load associated with causing plastic deformation of the first panel. In such examples, in response to the first panel receiving the first target load, one or more of the disclosed structural feature(s) is/are configured to collapse while the first panel bends around the structure, thereby increasing a bend radius forming on the first panel in the first segment during such a vehicle impact event. This large radius bend of the first panel effectively distributes an associated contact force over relatively large area of the second panel, thereby substantially reducing peak tensile strain of the second panel as well as the risk tearing of the second panel. In other words, the disclosed structural features are configured to prevent the second panel from tearing during the vehicle impact event, which would have otherwise been unattainable using the above-mentioned known vehicle body safety features.

Each of the disclosed structural feature(s) has a specific width, depth, and/or position relative to the first panel to control a compressive strength of the pillar. In some examples, the structural feature(s) are formed on the first panel via one or more manufacturing processes such as stamping. In such examples, each of the structural feature(s) includes a recessed area (e.g., a groove) defined by a first side of the first panel and a protruding area defined by a second side of the first panel opposite the first side. In particular, when the first target load is applied to the first panel in the first segment of the pillar, the disclosed structural feature(s) urge the first panel to bend, buckle, and/or otherwise deform at particular location(s) on the first panel defined by the respective structural feature(s), which provides the large radius bend. In this manner, disclosed examples control a load distribution through the pillar and/or the roof side rail during crash impact loading by controlling the bend radius associated with the first segment of the first panel. Because the disclosed structural feature(s) may be stamped into the first panel, disclosed examples improve vehicle safety while reducing and/or eliminating additional parts that would have otherwise been required by the above-mentioned known vehicle body safety components.

Additionally, in some examples, the disclosed structural feature(s) are tuned to maintain a pillar section strength needed to achieve one or more other performance targets of the vehicle such as, for example, roof strength and frontal crash targets. For example, one or more parameters of the structural feature(s), such as relative location, size, shape, etc., can be specified to sufficiently mitigate side effect(s) associated with one or more other crash modes. In particular, in examples where the disclosed pillar is an end pillar such as an A-Pillar, the first panel is configured to resist a second target load (e.g., a front load) different from the first target load, for example, during a front crash barrier impact test. In such examples, when the second target load or a portion thereof is applied to an end of the first panel, a first portion of the pillar is loaded in compression and a second portion of the pillar, different from the first portion, is loaded in tension. The first portion of the first panel associated with tension is positioned below a natural axis of the pillar, and the second portion associated with compression is positioned above the neutral axis. In such examples, all of the disclosed positioning feature(s) are disposed on the second portion of the pillar (i.e., above the neutral axis), which prevents the first panel and/or, more generally, the pillar from buckling during such a frontal vehicle collision. In some examples, all of the structural feature(s) are positioned on a top ridgeline of the first panel. Such placement of the structural feature(s) relative to the first panel maintains a sufficient loading capacity of the first pillar.

FIG. 1 is a view of an example vehicle (e.g., a car, a truck, a van, a sport utility vehicle (SUV), etc.) 100 in which examples disclosed herein can be implemented. According to the illustrated example of FIG. 1, the vehicle 100 includes an example body 102 (sometimes referred to as a vehicle body) comprising a first example rail (e.g., a roof rail or a roof side rail) 104 and a first example pillar (e.g., an end pillar such as an A-Pillar) 106, which facilitate supporting and/or securing a roof (e.g., a body panel) 108 of the vehicle 100. The first rail 104 of FIG. 1 is coupled to the roof 108 and extends along a first side 109 of the roof 108 at least partially across a dimension (e.g., a length) of the roof 108. In particular, the first rail 104 of FIG. 1 is formed and/or defined by one or more pillars of the vehicle 100, as discussed further below. For example, at least a portion of the first rail 104 is formed and/or defined by one or more panels of the first pillar 106.

The first pillar 106 of FIG. 1 is configured to carry a weight associated with the first rail 104 and/or a window (e.g., a windshield) 110 of the vehicle 100, for example, cooperatively with one or more other vehicle pillars and/or one or more other vehicle rails. In some examples, the first pillar 106 of FIG. 1 is configured to support the window 110 cooperatively with a second example pillar (e.g., an end pillar such as an A-Pillar) 112 of the vehicle 102. In such examples, each of the first pillar 106 and the second pillar 112 is coupled (e.g., removably coupled) to the window 110 to better secure the window 110 and/or maintain a position of the window 110 relative to the vehicle body 102. In other words, the window 110 of FIG. 1 is coupled between the first and second pillars 106, 112. As shown in FIG. 1, the vehicle body 102 also includes one or more other pillars in which examples disclosed herein can be implemented such as, for example, a third example pillar (e.g., a center pillar such as a B-Pillar) 114 and a fourth example pillar (e.g., an end pillar such as a C-Pillar) 116. However, in some examples, the vehicle body 102 is implemented using one or more fewer, additional, and/or different vehicle pillars relative to the vehicle pillars 106, 112, 114, 116 of FIG. 1.

As shown in FIG. 1, the vehicle body 102 of FIG. 1 is associated with a first axis (e.g., an x-axis) 118, a second axis (e.g., a y-axis) 120, and a third axis (e.g., a z-axis) 122 that are perpendicular to each other. The first axis 118 of FIG. 1 is a longitudinal axis associated with the vehicle 100, which is sometimes referred to as a roll axis. The second axis 120 of FIG. 1 is a lateral axis associated with the vehicle 100, which is sometimes referred to as a transverse or pitch axis. The third axis 122 of FIG. 1 is a vertical axis associated with the vehicle 100, which is sometimes referred to as a yaw axis.

According to the illustrated example of FIG. 1, when a first vehicle impact event (e.g., a pole side impact test) occurs, a first structure (e.g., a substantially rigid pole) imparts a first load (e.g., side load) 126 on a side portion 128 of the vehicle body 102, for example, resulting from the vehicle 100 impacting the first structure. In some examples, the first load 126 of FIG. 1 includes a component (e.g., a horizontal force component) directed at the first rail 104 in a horizontal direction and/or substantially transverse relative to the vehicle body 102. That is, in such examples, the component of the first load 126 is substantially perpendicular to the first axis 118 and/or the third axis 122. As such, the component of the first load 126 is substantially parallel relative to the second axis 120. When the first load 126 and/or the component thereof is/are above a target or threshold load (e.g., a predefined value corresponding to a load causing a portion of the first pillar 106 to plastically deform), at least a portion of the vehicle body 102 bends (e.g., plastically) around the first structure. In particular, to protect a cabin space of the vehicle 100 and/or at least one vehicle safety component (e.g., an airbag such a curtain shield airbag) in such an event, disclosed examples advantageously control bending and/or deformation of the first pillar 106 in response to the component of the first load 126 reaching or crossing the threshold load, as discussed further below. As a result, disclosed examples also advantageously control a load distribution through a section of the first pillar 106 to which the first load 126 is applied. Some disclosed examples cause the first pillar 106 to transfer the first load 126 to a relatively large area of the first rail 104 during the first vehicle impact event, which prevents the first rail 104 or a portion thereof (e.g., a rail inner panel) from tearing and/or otherwise forming a sharp or jagged surface.

Additionally or alternatively, when a second vehicle impact event (e.g., one of a full frontal rigid barrier crash test, an offset deformable barrier crash test, etc.) occurs different from the first vehicle impact event, the first structure and/or a different structure (e.g., a substantially rigid barrier) imparts a second load (e.g., a front load) 130 on a front portion 132 of the vehicle body 102. In such examples, the second load 130 is substantially different relative to the first load 126. For example, the second load 130 of FIG. 1 includes a component (e.g., a horizontal force component) directed at a portion (e.g., an end) of the first pillar 106 in a substantially horizontal direction. That is, the component of the second load 130 is substantially parallel relative to the first axis 118. As such, the component of the second load 130 is substantially perpendicular relative to the second axis 120 and/or the third axis 122. In particular, disclosed examples substantially prevent buckling of the pillar 106 when the second load 130 is generated. Thus, some disclosed examples account for one or more vehicle crash modes.

Although FIG. 1 depicts the first rail 104, in some examples, the vehicle body 102 includes one or more other rails in which examples disclosed herein can be implemented. In such examples, the vehicle body 102 of FIG. 1 also includes at least a second example rail (e.g., similar to the first rail 104) 134 that is formed and/or defined by one or more vehicle pillars such as, for example, at least the second pillar 112 of FIG. 1. Additionally, in such examples, the second rail 134 is coupled to the roof 108 and extends along a second side 136 of the roof 108, opposite the first side 109, at least partially across the dimension of the roof 108.

Figure 2:
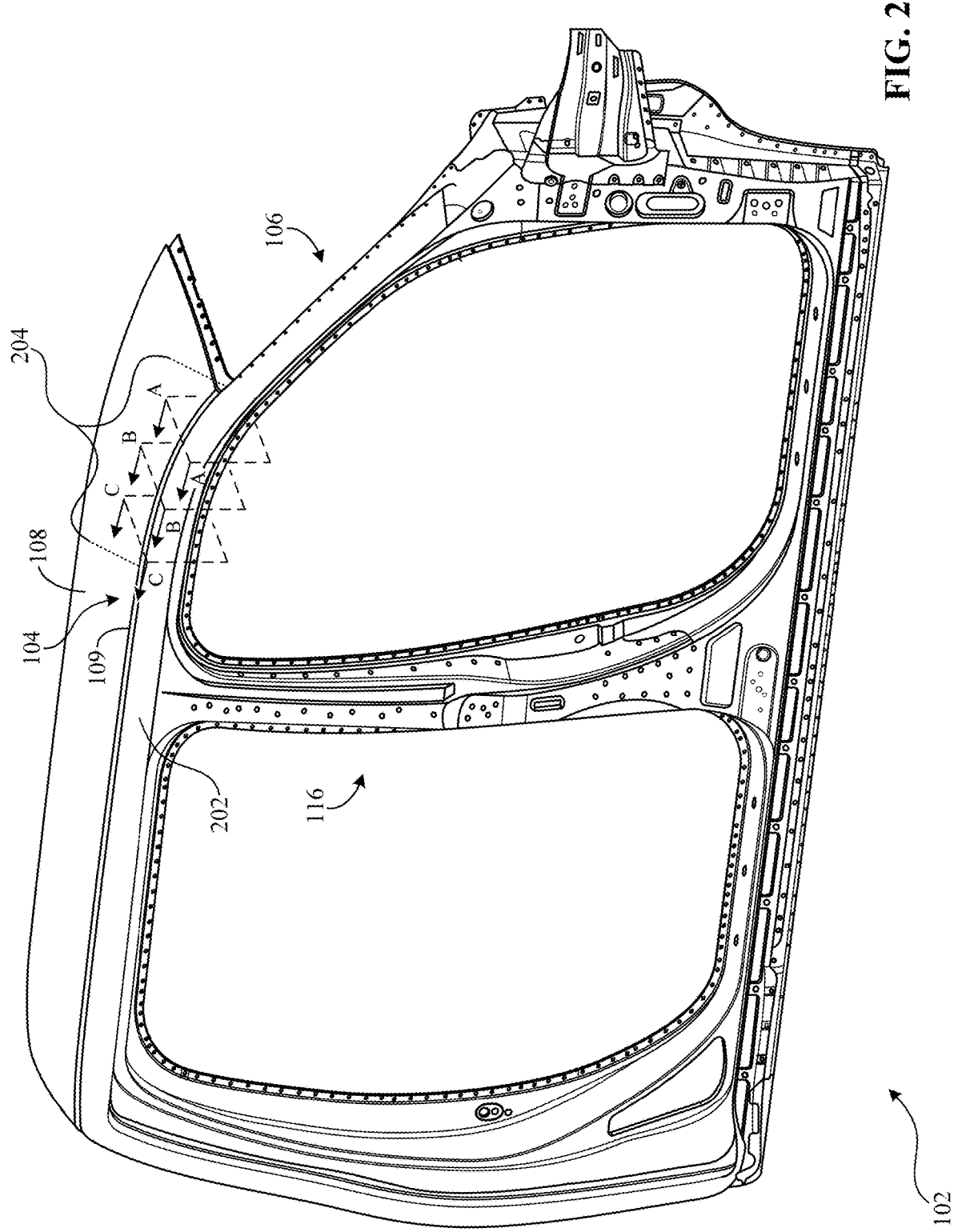
FIG. 2 is a detailed view of a vehicle body and shows an example rail and an example pillar.

FIG. 2 is a detailed view of the vehicle body 102 of FIG. 1 and shows the first rail 104 and the first pillar 106. According to the illustrated example of FIG. 2, the vehicle body 102 includes an example cover (e.g., a layer having a stylized surface) 202 that covers one or more structural components (e.g., one or more panels) of the first rail 104 and/or the first pillar 106. In particular, the cover 202 is particularly sized, shaped, and/or stylized, for example, based on a type of the vehicle 100, which may be desirable to a vehicle owner or driver. The cover 202 of FIG. 2 can be implemented, for example, using one or more panels, one or more moldings, trim, etc. Further, the cover 202 can be constructed of, for example, plastic, metal, and/or any other material(s) having qualities and/or characteristics suitable for exterior vehicle use.

According to the illustrated example of FIG. 2, the first pillar 106 includes a first segment (e.g., an upper segment) 204 at least partially overlapping with the vehicle roof 108, which is sometimes referred to as a primary portion of the first pillar 106. As shown in FIG. 2, at some or all of the first segment 204 of the first pillar 106 is curved along at least a partial length of the first segment 204. The first segment 204 of FIG. 2 is adjacent to the first side 109 of the vehicle roof 108 and/or extends along the first side 109 at least partially across the dimension of the roof 108. The first segment 204 of the first pillar 106 forms and/or defines a portion of the first rail 104 that is configured to provide support to the vehicle roof 108. In particular, during the first vehicle impact event, the first load 126 or the component thereof is applied to the first segment 204 of the first pillar 106, which triggers a primary deformation mode of the first pillar 106 associated with reducing tensile strain imparted on the first rail 104. In some examples, the first segment 204 of FIG. 2 or at least a portion thereof is configured to bend in a controlled manner when the first load 126 is applied to the first segment 204 during the first vehicle impact event. For example, the first segment 204 is configured to form a controlled bend (e.g., the second bend 1502 of FIG. 15) relative to first load 126 and having a bend radius that is substantially large and/or continuous.

The vehicle body 102 of FIG. 2 can be produced via one or more automotive manufacturing processes. In some examples, the vehicle body 102 is produced in accordance with a vehicle on body design. In such examples, the vehicle body 102 is configured to couple to a frame or chassis of the vehicle 100, for example, via one or more example fasteners and/or one or more example fastening methods or techniques. Alternatively, in some examples, the vehicle body 102 of FIG. 2 is produced in accordance with a unibody design. In such examples, the vehicle body 102 and the frame of the vehicle 100 are integrated to form a single-piece component.

Figure 3:
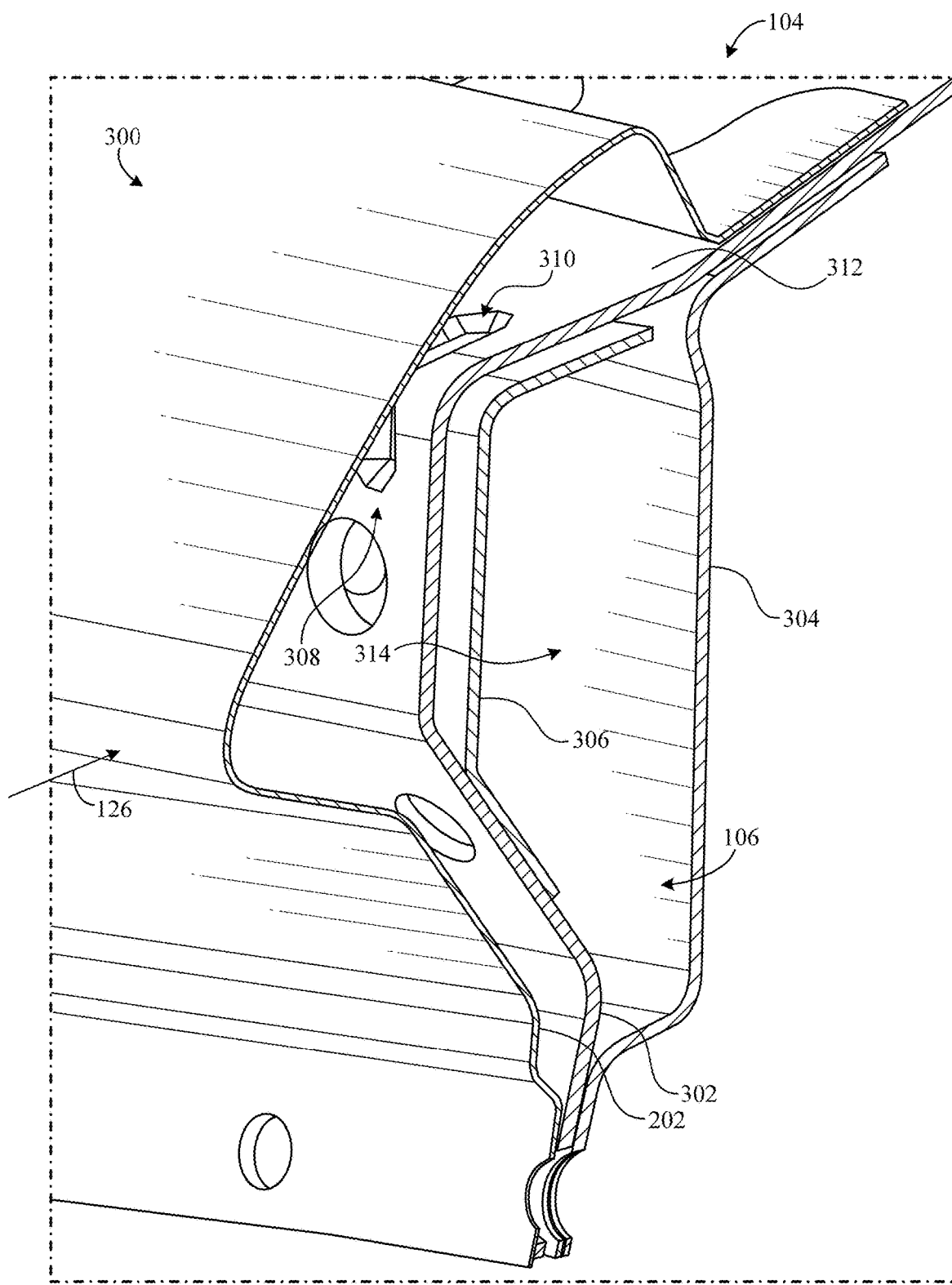
FIG. 3 is a cross-sectional view of the example rail of FIG. 2 along line A-A and shows a first cross-sectional area of the example rail corresponding to a segment of the example pillar of FIG. 2 in accordance with the teachings of this disclosure.

FIG. 3 is a cross-sectional view of the first rail 104 of FIG. 2 along line A-A and shows a first cross-sectional area 300 of the first rail 104 corresponding to the first segment 204 of the first pillar 106 in accordance with the teachings of this disclosure. According to the illustrated example of FIG. 3, the first pillar 106 includes a first example panel (e.g., an outer panel) 302. Further, the first rail 104 of FIG. 3 includes a second example panel (e.g., an inner panel) 304 and a third example panel (e.g., a reinforcing panel) 306. The first panel 302 of FIG. 3 is interposed between the cover 202 and the second panel 304. Further, the third panel 306 of FIG. 3 is interposed between the first and second panels 302, 304, which provides reinforcement to the first rail 104. In particular, to provide the first rail 104, the cover 202, the first panel 302, the second panel 304, and the third panel 306 are assembled and coupled together, for example, via one or more fasteners and/or one or more fastening methods or techniques (e.g., welding).

According to the illustrated example of FIG. 3, the first panel 302 is an outer panel of the first pillar 106 such as, for example, an A-Pillar outer panel, which is sometimes referred to as an A-Pillar outer. Further, the second panel 304 of FIG. 3 is an inner panel of the first rail 104 such as, for example, a rail inner panel, which is sometimes referred to as a rail inner. In some examples, at least a portion of the second panel 304 and/or at least a portion of the third panel 306 is/are positioned beneath the first panel 302. In other words, the first panel 302 extends at least partially over the second panel 304 and/or the third panel 306. Additionally, the first panel 302 of FIG. 3 is disposed beneath the cover 202. The first panel 302, the second panel 304, and/or the third panel 306 may be constructed of one or more materials having sufficient strength and/or rigidity such as, for example, any of (a) steel, (b) aluminum, (c) etc. (d) any other suitable material(s), or (e) a combination thereof. In some examples, each of the first, second, and third panels 302, 304, 306 is constructed of a different grade of steel relative to the each other.

To facilitate controlling deformation of the first pillar 106 during the first vehicle impact event, the first pillar 106 includes a first example structural feature (e.g., a bead) 308 positioned on the first panel 302 adjacent the third panel 306, which is sometimes referred to as a weak spot or trigger point. For example, the first structural feature 308 includes a recessed area (e.g., a groove) 310 formed and/or defined by a first surface (e.g., an outer surface) 312 of the first panel 302. As such, the recessed area 310 of FIG. 3 is positioned on the first panel 302 and/or extends at least partially into the first panel 302. As shown in FIG. 3, the first surface 312 of the first panel 302 includes one or more curvatures.

Although FIG. 3 depicts a single structural feature 308, in some examples, the first panel 302 of FIG. 3 is implemented differently.

When the first load 126 of FIG. 3 or the component thereof is imparted on a portion (e.g., the cover 202) of the vehicle body 102, the first load 126 may cause one or more (e.g., all) of the cover 202, the first panel 302, the second panel 304, and/or the third panel 306 to substantially deform relative to the first load 126. That is, in some examples, one or more (e.g., all) of the cover 202, the first panel 302, the second panel 304, and/or the third panel 306 are configured to form a controlled bend in response to the side portion 128 of the vehicle body 102 receiving the first load 126 or the portion thereof. As a result, the vehicle body 102 absorbs the first load 126 and/or increases a time interval during which the first load 126 is applied to the portion of the vehicle body 102. In this manner, disclosed examples improve vehicle safety by reducing an associated impulse input into a vehicle cabin when the first vehicle impact event occurs. In such examples, the first load 126 or the component thereof is successively transmitted through (a) the cover 202, (b) the first panel 302, (c) the third panel 306, and (d) the second panel 304. In particular, the first panel 302 and/or the third panel 306 is/are configured to directly contact an example area (e.g., an outer area) 314 of the second panel 304, which is sometimes referred to as an impact area.

In some examples, the first load 126 or the component thereof is transmitted to the first panel 302 at a first point on the first panel 302 that is at or proximate to the first structural feature 308. In such example, when the first load 126 or the component thereof is at or above the threshold load, the first structural feature 308 causes the first panel 302 to bend, buckle, and/or otherwise deform at a second point on the first panel 302 that is defined by the first structural feature 308. In some examples, the second point on the first panel 302 is spaced from the first point on the first panel 302 at which the first load 126 or the component thereof is applied. In particular, the first structural feature 308 is configured to cause the first panel 302 to form a bend (e.g., a large radius bend) that distributes and/or transfers the load 126 onto the area 314 of the second panel 304 to prevent the second panel 304 from tearing during the first vehicle impact event in which the load 126 is imparted on the first panel 302. In some examples, the first structural feature 308 is configured to cause the bend radius associated with the first segment 204 to increase and/or remain above a target bend radius while the first segment 204 is bending, as discussed further below in connection with FIG. 15. As a result, disclosed examples increase the impact area 314 directly contacted by the first panel 302 and/or the third panel 306 during the first vehicle impact event, which facilitates reducing strain (e.g., tensile strain) applied to the second panel 304.

Figure 4:
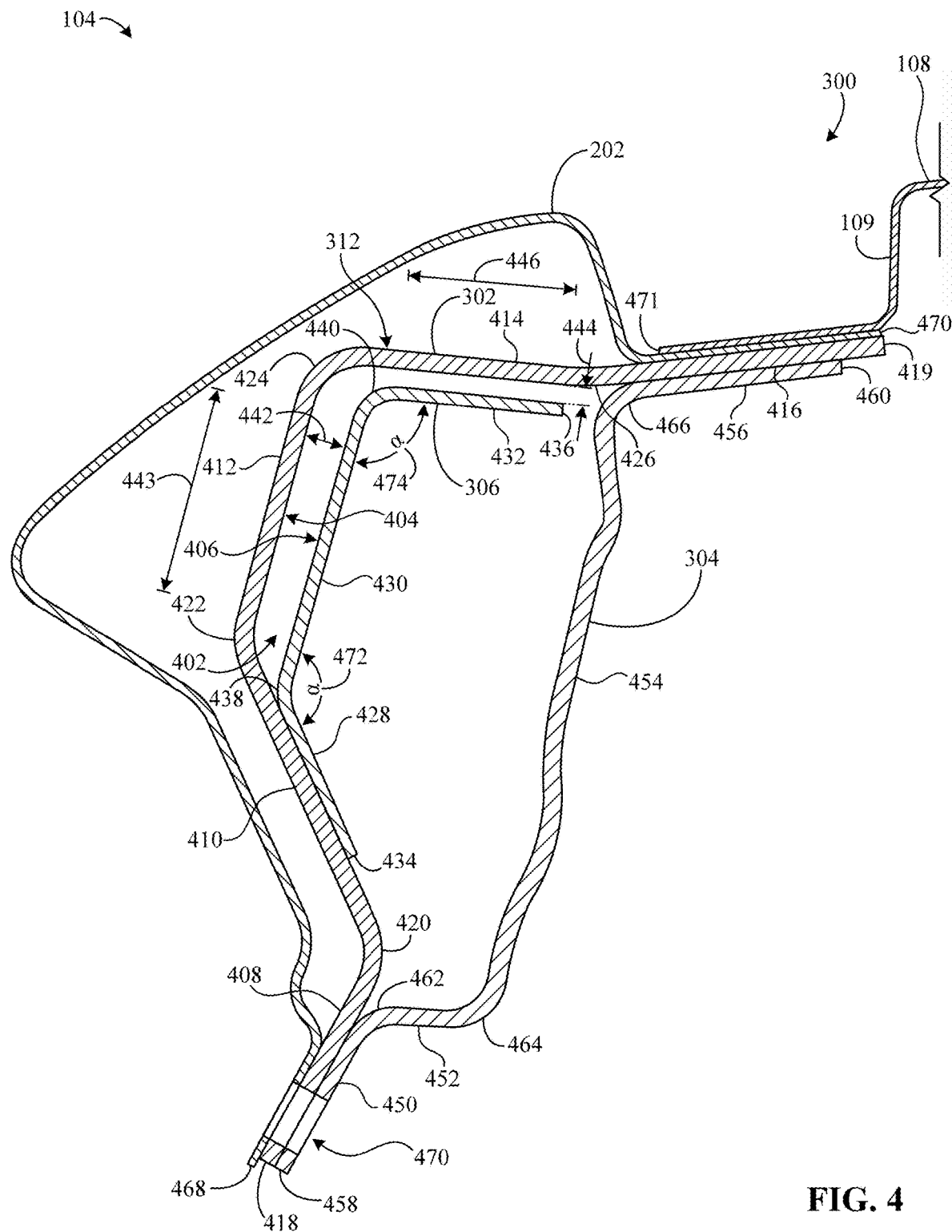
FIG. 4 is another cross-sectional view of the example rail of FIG. 2 along line -A and shows the first cross-sectional area of the example rail.

FIG. 4 is another cross-sectional view of the first rail 104 of FIG. 2 along line A-A and shows the first cross-sectional area 300 of the first rail 104. In some examples, each of the first panel 302, the second panel 304, and the third panel 306 extends along the first side 109 of the roof 108 at least partially across the dimension of the roof 108. According to the illustrated example of FIG. 4, the first panel 302 and the third panel 306 form and/or define a first example space (e.g., an inner space such as a cavity or pocket) 402 into which one or more structural features of the first pillar 106 extend. In particular, the first space 402 of FIG. 4 is sized and/or shaped to receive the first structural feature 308 and/or one or other such structural features. As shown in FIG. 4, the first panel 302 has a second surface (e.g., an inner surface) 404 opposite the first surface 312 of the first panel 302, a portion of which is spaced by a distance from a first surface (e.g., an outer surface) 406 of the third panel 306. In such examples, the second surface 404 of the first panel 302 and the first surface 406 of the third panel 306 oppose and/or face each other.

In some examples, the first panel 302 includes a first portion (e.g., an end portion) 408, a second portion (e.g., an intermediate portion) 410, a third portion (e.g., an intermediate portion) 412, a fourth portion (e.g., an intermediate portion) 414, and a fifth portion (e.g., an end portion) 416 that are coupled and/or connected together. As shown in FIG. 4, the first, second, third, fourth, and fifth portions 408, 410, 412, 414, 416 form and/or define an integral or single-piece component (e.g., the first panel 302). The first portion 408 of the first panel 302 includes and/or corresponds to a first end 418 of the first panel 302. Further, the fifth portion 416 includes and/or corresponds to a second end 419 of the first panel 302 opposite the first end 418. The second, third, and fourth portions 410, 412, 414 of the first panel 302 are interposed between the first and fifth portions 408, 416. As such, the first panel 302 of FIG. 4 extends from the first end 418 of the first panel 302 to the second end 419 of the first panel 302.

Additionally, in some examples, the first panel 302 includes one or more preformed curvatures or bends 420, 422, 424, 426 positioned thereon, which improve vehicle body strength and/or rigidity. Four of the preformed bend(s) 420, 422, 424, 426 are shown in the illustrated example of FIG. 4 such as, for example, a first bend 420 of the first panel 302, a second bend 422 of the first panel 302, a third bend 424 of the first panel 302, and a fourth bend 426 of the first panel 302. The bend(s) 420, 422, 424, 426 of the first panel 302 can be produced, for example, via one or more manufacturing processes. In such examples, one or more (e.g., all) of the first portion 408, the second portion 410, the third portion 412, the fourth portion 414, and/or the fifth portion 416 of the first panel 302 at least partially form and/or define the bend(s) 420, 422, 424, 426 of the first panel 302. For example, the first and second portions 408, 410 of the first panel 302 form and/or define the first bend 420 of the first panel 302. That is, in such examples, the first bend 420 is an interface between the first and second portions 408, 410 of the first panel 302. In another example, the second and third portions 410, 412 of the first panel 302 form and/or define the second bend 422 of the first panel 302. That is, in such examples, the second bend 422 is an interface between the second and third portions 410, 412 of the first panel 302. In another example, the third and fourth portions 412, 414 form and/or define the third bend 424 of the first panel 302. That is, in such examples, the third bend 424 is an interface between the third and fourth portions 412, 414. In another example, the fourth and fifth portions 414, 416 of the first panel 302 form and/or define the fourth bend 426 of the first panel 302. That is, in such examples, the fourth bend 426 is an interface between the fourth and fifth portions 414, 416 of the first panel 302.

Further, in some examples, the third panel 306 includes a first portion (e.g., an end portion) 428, a second portion (e.g., an intermediate portion) 430, and a third portion (e.g., an end portion) 432, that are coupled and/or connected together, similar to the first panel 302. As shown in FIG. 4, the first, second, and third portions 428, 430, 432 of the third panel 306 form and/or define an integral or single-piece component (e.g., the third panel 306). The first portion 428 of the third panel 306 includes and/or corresponds to a first end (e.g., a proximal end) 434 of the third panel 306. Further, the third portion 432 includes and/or corresponds to a second end (e.g., a distal end) 436 of the third panel 306 opposite the first end 434. The second portion 430 of the third panel 306 is interposed between the first and third portions 428, 432. As such, the third panel 306 of FIG. 4 extends from the first end 434 of the third panel 306 to the second end 436 of the third panel 306.

Additionally, in some examples, the third panel 306 includes one or more preformed curvatures or bends 438, 440 positioned thereon, which further improve vehicle body strength and/or rigidity. Two of the preformed bend(s) 438, 440 are shown in the illustrated example of FIG. 4 such as, for example, a first bend 438 of the third panel 306 and a second bend 440 of the third panel 306. The bend(s) 438, 440 of the third panel 306 can be produced, for example, via one or more manufacturing processes. In such examples, one or more (e.g., all) of the first portion 428, the second portion 430, and/or the third portion 432 at least partially form and/or define the bend(s) 438, 440 of the third panel 306. For example, the first and second portions 428, 430 of the third panel 306 form and/or define the first bend 438 of the third panel 306. That is, in such examples, the first bend 438 is an interface between the first and second portions 428, 430 of the third panel 306. In another example, the second and third portions 430, 432 of the third panel 306 form and/or define the second bend 440 of the third panel 306. That is, in such examples, the second bend 440 is an interface between the second and third portions 430, 432 of the third panel 306.

The third panel 306 of FIG. 4 is coupled to a portion of the first panel 302, for example, via one or more fasteners and/or one or more example fastening methods or techniques. As shown in FIG. 4, the first portion 428 of the third panel 306 is positioned on the and/or directly contacting the second portion 410 of the first panel 302. As such, in FIG. 4, the first end 434 of the third panel 306 is a proximal end of the third panel 306. In some examples, the second portion 410 of the first panel 302 and the first portion 428 of the third panel 306 provide an example auxiliary weld location associated with the first rail 104, as discussed further below in connection with FIG. 13. Further, the second portion 430 of the third panel 306 extends away from first bend 438 of the third panel 306. (i.e., away from the second portion 410 of the first panel 302) toward the fourth portion 414 of the first panel 302 to provide the first surface 406 of the third panel 306. As previously mentioned, the first surfaces 404, 406 of the respective first and third panels 302, 306 are spaced from each other, for example, such that a first example gap 442 is formed by and/or positioned between the third portion 412 of the first panel 302 and the second portion 430 of the third panel 306. In particular, the first panel 302 and/or the third panel 306 is/are sized, shaped, structured, and/or otherwise configured such that the first gap 442 is substantially maintained between the third portion 412 of the first panel 302 and the second portion 430 of the third panel 306 (e.g., prior to the first vehicle impact event). As shown in FIG. 4, a thickness or size of the first gap 442 is substantially uniform at least partially across a first dimension (e.g., a height) 443 of (a) the third portion 412 of the first panel 302 or (b) the second portion 430 of the third panel 306.

As shown in FIG. 4, the third portion 432 of the third panel 306 extends away from the second bend 440 of the third panel 306 toward the second panel 304 and/or to the second end 436 of the third panel 306. As such, in FIG. 4, the second end 436 of the third panel 306 is a distal end of the third panel 306. In some examples, the second end 436 of FIG. 4 of the third panel 306 is proximate to part of the second panel 304. Additionally, in some examples, the first panel 302 and/or the third panel 306 is/are sized, shaped, structured, and/or otherwise configured such that a second gap 444 is substantially maintained between the fourth portion 414 of the first panel 302 and the third portion 432 of the third panel 306 (e.g., prior to the first vehicle impact event). In such examples, the first gap 442 and the second gap 444 provide the first space 402. Accordingly, the second gap 444 of FIG. 4 is connected to the first gap 442 such that the first and second gaps 442, 444 form a single or continuous gap (e.g., a non-uniform gap). As shown in FIG. 4, a thickness or size of the second gap 444 is substantially uniform at least partially across a second dimension (e.g., a width) 446 of (a) the fourth portion 414 of the first panel 302 or (b) the third portion 432 of the third panel 306. Additionally, in some such examples, the first gap 442 is substantially thicker or larger relative to the second gap 444, as shown in FIG. 4. That is, the thickness or size of the first gap 442 of FIG. 4 is greater than the thickness or size of the second gap 444. However, in some examples, the first panel 302 and/or the third panel 306 is/are implemented differently, for example, such that the first and second gaps 442, 444 are substantially the same thickness or size relative to each other.

Further, in some examples, the second panel 304 includes a first portion (e.g., an end portion) 450, a second portion (e.g., an intermediate portion) 452, a third portion (e.g., an intermediate portion) 454, and a fourth portion (e.g., an end portion) 456 that are coupled and/or connected together, similar to the first and third panels 302, 306. As shown in FIG. 4, the first, second, third, and fourth portions 450, 452, 454, 456 of the second panel 304 form and/or define an integral or single-piece component (e.g., the second panel 304). The first portion 450 of the second panel 304 includes and/or corresponds to a first end 458 of the second panel 304. Further, the fourth portion 456 includes and/or corresponds to a second end 460 of the second panel 304 opposite the first end 458. The second and third portion 452 of the second panel 304 is interposed between the first and third portions 450, 454. Further, the third portion 454 of the second panel 304 is interposed between the second and fourth portions 452, 456. As such, the second panel 304 of FIG. 4 extends from the first end 458 of the second panel 304 to the second end 460 of the second panel 304.

In some examples, the second panel 304 includes one or more preformed curvatures or bends 462, 464, 466 positioned thereon, which further improve vehicle body strength and/or rigidity. Three of the preformed bend(s) 462, 464, 466 are shown in the illustrated example of FIG. 4 such as, for example, a first bend 462 of the second panel 304, a second bend 464 of the second panel 304, and a third bend 466 of the second panel 304. The bend(s) 462, 464, 466 of the second panel 304 can be produced, for example, via one or more manufacturing processes. In such examples, one or more (e.g., all) of the first portion 450, the second portion 452, the third portion 454, and/or the fourth portion 456 at least partially form and/or define the bend(s) 462, 464, 466 of the second panel 304. For example, the first and second portions 450, 452 of the second panel 304 form and/or define the first bend 462 of the second panel 304. That is, in such examples, the first bend 462 is an interface between the first and second portions 450, 452 of the second panel 304. In another example, the second and third portions 452, 454 of the second panel 304 form and/or define the second bend 464 of the second panel 304. That is, in such examples, the second bend 464 is an interface between the second and third portions 452, 454 of the second panel 304. In another example, the third and fourth portions 454, 456 of the second panel 304 form and/or define the third bend 466 of the second panel 304. That is, in such examples, the third bend 466 is an interface between the third and fourth portions 454, 456 of the second panel 304.

In some examples, one or more (e.g., all) of the first end 418 of the first panel 302, the first end 458 of the second panel 304, and/or a first end 468 of the cover 202 are coupled together, for example, via one or more fasteners and/or one or more fastening methods or techniques. As shown in FIG. 4, the first ends 418, 458, 468 of respective ones of the first panel 302, the second panel 304, and the cover 202 are positioned adjacent each other. Similarly, in some examples, one or more (e.g., all) of the second end 419 of the first panel 302, the second end 460 of the second panel 304, a second end 470 of the cover 202, and an end 471 of the vehicle roof 108 are coupled together. As shown in FIG. 4, the second end 470 of the cover 202 is opposite the first end 468 of the cover 202. As such, in some examples, the first panel 302 of FIG. 4 is coupled between the second panel 304 and the roof 108.

In some examples, at least a portion of the third panel 306 is similarly shaped relative to the first panel 302, which facilitates forming the first space 402 and/or maintaining the gap(s) 442, 444 associated therewith. For example, the second, third, and fourth portions 410, 412, 414 of the first panel 302 define a first geometric figure that is substantially similar to a second geometric figure defined by the first, second, and third portions 428, 430, 432 of the third panel 306. That is, the first and second geometric figures have substantially the same shape while differing in size. In such examples, as a result of forming the second bend 422 of the first panel 302, the second and third portions 410, 412 of the first panel 302 are positioned and/or oriented relative to each to such that a first angle 472 is defined by the first and second portions 410, 412 of the first panel 302. In other words, the second portion 410 of the first panel 302 is angled relative to the third portion 412 of the first panel 302. For example, the first angle 472 of FIG. 4 is substantially between 90 degrees and 175 degrees. Further, as a result of forming the first bend 438 of the third panel 306, the first and second portions 428, 430 of the third panel 306 are positioned and/or oriented relative to each other to such that the first angle 472 (i.e., the same angle 472) is substantially defined by the first and second portions 428, 430 of the third panel 306. Stated differently, in such examples, an angle associated with the second and third portions 410, 412 of the first panel 302 is substantially equal or the same relative to an angle associated with the first and second portions 428, 430 of the third panel 306. In such examples, the second bend 422 of the first panel 302 has a radius that is substantially larger relative to a radius of the first bend 438 of the third panel 306.

Additionally, in some examples, as a result of forming the third bend 424 of the first panel 302, the third and fourth portions 412, 414 of the first panel 302 are positioned and/or orientated to each other such that a second angle 474 is defined by the third and fourth portions 412, 414 of the first panel 302. In other words, the third portion 412 of the first panel 302 is angled relative to the fourth portion 414 of the first panel 302. For example, the second angle 474 of FIG. 4 is substantially between 90 degrees and 175 degrees. Further, as a result of forming the second bend 440 of the third panel 306, the second and third portions 430, 432 of the third panel 306 are positioned and/or oriented relative to each other such that the second angle 474 (i.e., the same angle) is substantially defined by the second and third portions 430, 432 of the third panel 306. Stated differently, in such examples, an angle associated with the third and fourth portions 412, 414 of the first panel 302 is substantially equal or the same relative to an angle associated with the second and portions 430, 432 of the third panel 306. In such examples, the third bend 424 of the first panel 302 has a radius that is substantially larger relative to a radius of the second bend 440 of the third panel 306.

As shown in FIG. 4, a thickness of the first panel 302 is substantially greater relative to a thickness of the third panel 306. On the other hand, in some examples, the thickness of the first panel 302 is substantially the same relative to a thickness of the second panel 304.

In some examples, during the first vehicle impact event, the first load 126 or the component thereof causes the third portion 412 of the first panel 302 to move toward the second portion 430 of the third panel 306, which closes at least a portion of the first gap 442. Then, the second portion 430 of the third panel 306 engages and/or abuts the third portion 412 of the first panel 302, thereby resisting deformation of the first panel 302 and providing reinforcement to the first panel 302. Additionally or alternatively, the first load 126 or the component thereof causes one or more portions of the first panel 302 to move toward the second panel 304 such as, for example, one or more (e.g., all) of the second portion 410 of the first panel 302, the third portion 412 of the first panel 302, and/or the fourth portion 414 of the first panel 302. Further, in some examples where the first rail 104 is implemented using the third panel 306, the first load 126 or the component thereof causes one or more portions of the third panel 306 to move toward the second panel 304 such as, for example, one or more (e.g., all) of the first portion 428 of the third panel 306, the second portion 430 of the third panel 306, and/or the third portion 432 of the third panel 306. Then, the third portion 454 of the second panel 304 engages and/or abuts the corresponding portion(s) 410, 412, 414 of the first panel 302 and/or the corresponding portion(s) 428, 430, 430 of the third panel 306, thereby resisting intrusion of the first rail 104 into the cabin space of the vehicle 100. As such, the first panel 302 and/or the second panel 304 distribute the first load 126 or the component thereof onto the third portion 454 of the second panel 304.

Figure 5:
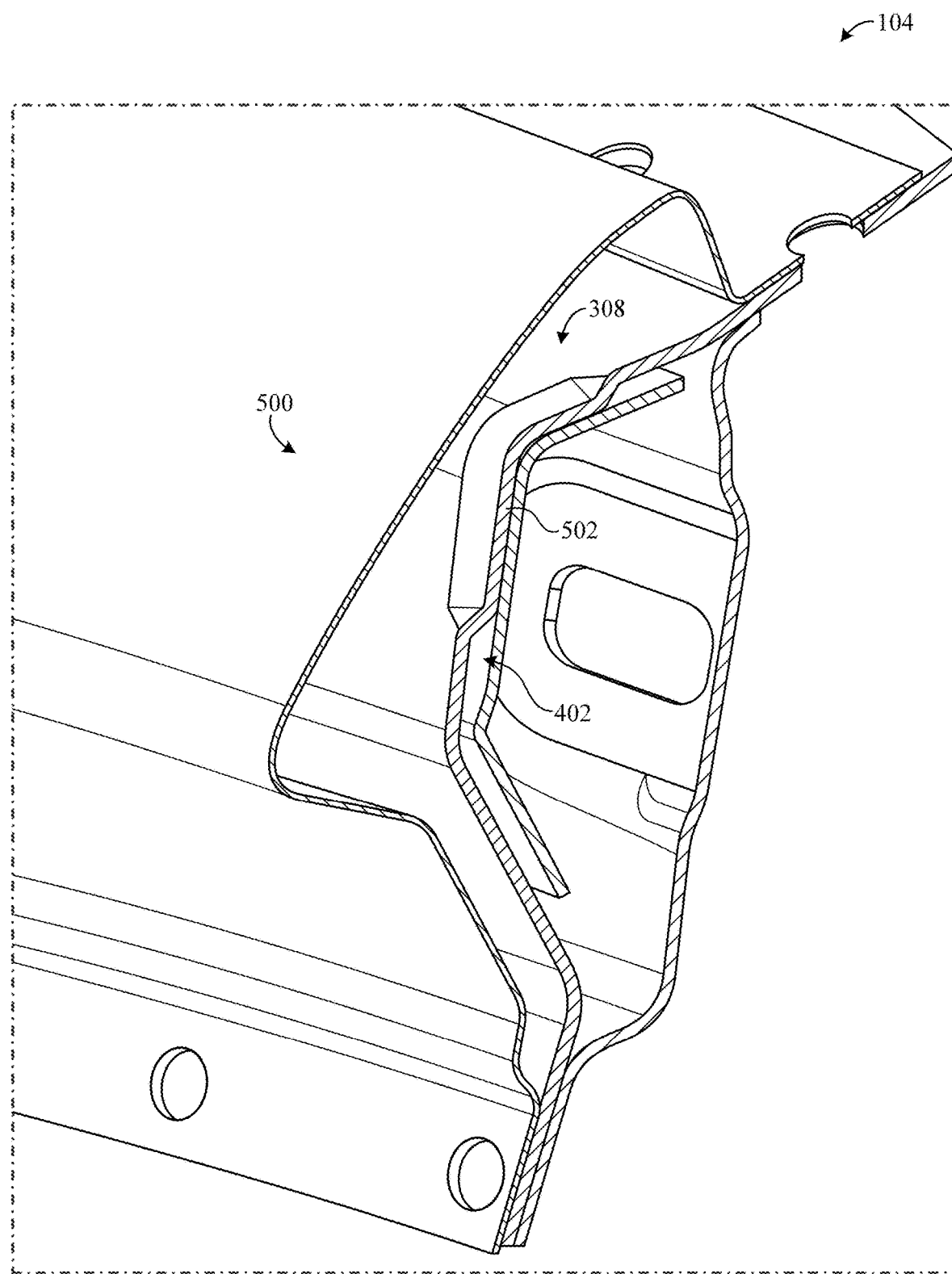
FIG. 5 is a cross-sectional view of the example rail of FIG. 2 along line B-B and shows a second cross-sectional area of the example rail corresponding to the segment of the example pillar of FIG. 2 in accordance with the teachings of this disclosure.

FIG. 5 is a cross-sectional view of the first rail 104 of FIG. 2 along line B-B and shows a second cross-sectional area 500 of the first rail 104 corresponding to the first segment 204 of the first pillar 106 in accordance with the teachings of this disclosure. The second cross-sectional area 500 of FIG. 5 is adjacent the first cross-sectional area 300 of FIGS. 3 and 4. According to the illustrated example of FIG. 5, the first structural feature 308 extends at least partially into the first space 402. Stated differently, at least a portion of the first structural feature 308 is positioned in the first space 402. In some examples, the first structural feature 308 is substantially symmetrical relative to a plane (e.g., a symmetry plane) corresponding to a cross-sectional area 502 of the first panel 302 that forms the first structural feature 308.

Figure 6:
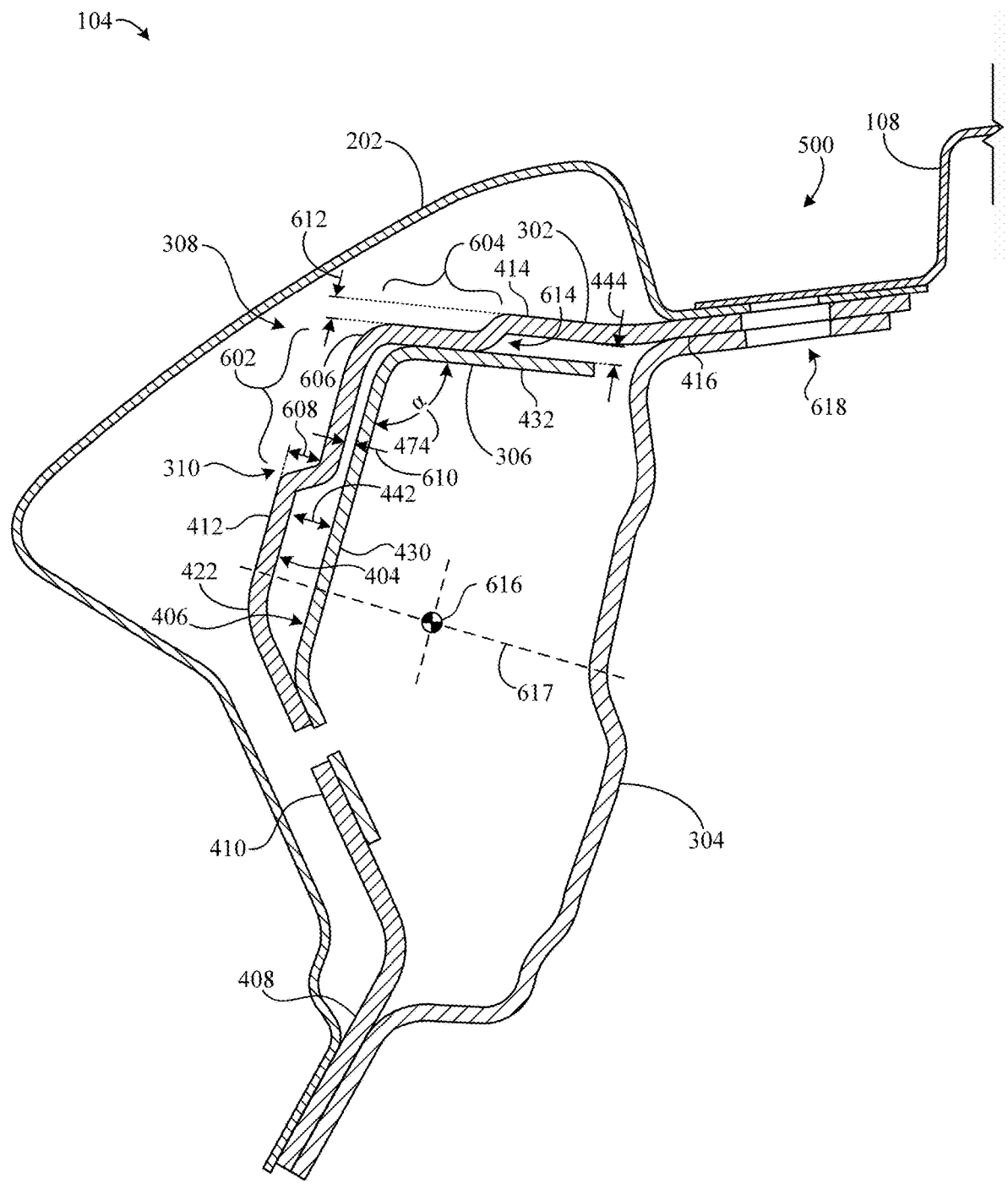
FIG. 6 is another cross-sectional view of the example rail of FIG. 2 along line B-B and shows the second cross-sectional area of the example rail.

FIG. 6 is another cross-sectional view of the first rail 104 of FIG. 2 along line B-B and shows the second cross-sectional area 500 of the first rail 104. According to the illustrated example of FIG. 6, the first structural feature 308 includes a first portion 602 and a second portion 604 that are coupled and/or connected together. The first portion 602 of the first structural feature 308 is formed and/or defined by at least part of the third portion 412 of the first panel 302. On the other hand, the second portion 604 of the first structural feature 308 is formed and/or defined by at least part of the fourth portion 414 of the first panel 302. Stated differently, in some examples, the first structural feature 308 is positioned on the third portion of the first panel 412 and the fourth portion 414 of the first panel 412. Further, in some examples, the first structural feature 308 includes one or more example bends of the first panel 302 such as, for example, a fifth bend 606 of the first panel 302. That is, the first and second portions 602, 604 of the first structural feature 308 at least partially form and/or define the fifth bend 606. In such examples, the fifth bend 606 is an interface between the first and second portions 602, 604 of the first structural feature 308. As a result of forming the fifth bend 606 and/or, more generally, the first structural feature 308, the first and second portions 602, 604 of the first structural feature 308 are positioned and/or oriented to each other such that the second angle 474 is substantially defined by the first and second portions 602, 604 of the first structural feature 308. In such examples, the fifth bend 606 of the first panel 302 has as radius that is substantially equal or the same relative to the radius of the second bend 440 of the third panel 306, as shown in FIG. 6.

According to the illustrated example of FIG. 6, the recessed area 310 includes a first portion corresponding to the first portion 602 of the first structural feature 308. In particular, the first portion of the recessed area 310 has a first depth 608 that is less than the thickness or size of the first gap 442. As a result, in such examples, a third gap (e.g., a relatively small gap compared to the first gap 442 and/or the second gap 444) 610 is substantially maintained between the first portion 602 of the first structural feature 308 and the second portion 430 of the third panel 306 (e.g., prior to the first vehicle impact event). On the other hand, in some examples, the recessed area 310 includes a second portion 604 adjacent the first portion 602 of the recessed area 310 and corresponding to the second portion 604 of the first structural feature 308. In particular, the second portion of the recessed area 310 has a second depth 612 that is substantially equal or the same relative to the thickness or size of the second gap 444. As a result, in such examples, the second portion 604 of the first structural feature 308 abuts and/or directly contacts the third portion 432 of the third panel 306 (e.g., prior to the first vehicle impact event). In some examples, the first depth 608 is substantially the same or equal relative to the second depth 612. However, in some examples, the recessed area 310 of FIG. 6 is implemented differently.

In some examples, the first structural feature 308 of FIG. 6 includes a protruding area 614 that is at least partially formed and/or defined by the second surface 404 of the first panel 302. In such examples, the protruding area 614 is positioned on the first panel 302 opposite relative to the recessed area 310. As shown in FIG. 6, the protruding area 614 extends away from the second surface 404 of the first panel 302 toward the first surface 406 of the third panel 306. In other words, the recessed area 310 and the protruding area 614 are positioned on the opposite sides of the first panel 302. As shown in FIG. 6, the protruding area 614 of the first structural feature 308 extends at least partially across the first gap 442 and/or the second gap 444. Further, the protruding area 614 of FIG. 6 includes a portion corresponding to the first portion 602 of the first structural feature 308. In some examples, during the first vehicle impact event, the portion of the protruding area 614 and/or the first portion 602 of the first structural feature 308 move(s) toward the second portion 430 of the third panel 306, which closes at least a portion of the third gap 610. Then, the second portion 430 of the third panel 306 engages and/or abuts the portion of the protruding area 614 and/or the first portion 602 of the first structural feature 308.

According to the illustrated example of FIG. 6, at least a portion of the second cross-sectional area 500 of the first rail 104 is associated with a first centroid 616 and a first neutral axis 617 that is/are defined by, for example, at least one or more (e.g., all) of the first panel 302, the second panel 304, the third panel 306, and/or the cover 202. In some examples, the first centroid 616 and/or the first neutral axis 617 correspond to a vehicle pillar such as, for example, the first pillar 106. In such examples, the first pillar 106 includes the first centroid 616 and/or the first neutral axis 617 such that the first panel 302 at least partially defines the first centroid 616 and/or the first neutral axis 617. The first neutral axis 617 of FIG. 6 extends through the first centroid 616 (i.e., the first neutral axis 617 and the first centroid 616 coincide with each other). The first centroid 616 and/or the neutral axis of FIG. 6 is/are based on one or more parameters associated with the first rail 104 or the component(s) 302, 304, 306 thereof such as, for example, a size, a shape, a mass distribution, etc. Additionally, the first neutral axis 617 may be based on (a) a direction of the second load 130 or the component thereof and/or (b) a location on the vehicle body 102 at which the second load 130 or the component thereof is applied. In particular, during the second vehicle impact event, a first portion of the first rail 104 that is below (in the orientation of FIG. 6) the first neutral axis 617 is loaded in compression in response to the first pillar 106 receiving second load 130. In some such examples, some or all of (a) the first portion 408 of the first panel 302, (b) the second portion 410 of the first panel 302, and/or (c) at least part (e.g., the part forming the second bend 422) of the third portion 412 of the first panel 302 are loaded in compression resulting from the second load 130. On the other hand, during the second vehicle impact event, a second portion of the first rail 104 that is above (in the orientation of FIG. 6) the first neutral axis 617 is loaded in tension in response to the first pillar 106 receiving the second load 130. In some such examples, some or all of (a) at least part (e.g., the part above or not forming the second bend 422) of the third portion 412 of the first panel 302, (b) the fourth portion 414 of the first panel 302, and/or the (c) the fifth portion 416 of the first panel 302 are loaded in tension resulting from the second load 130. As such, the first neutral axis 617 is associated with an intermediate portion of the first rail 104 that is load in neither compression nor tension. In particular, each of the first portion 602 of the first structural feature 308, the second portion 604 of the first structural feature 308, and/or, more generally, the first structural feature 308 is positioned above (in the orientation of FIG. 6) the first neutral axis 617. In this manner, the first structural feature 308 of FIG. 6 facilitates (a) controlling the deformation of first panel 302 during the first vehicle impact event and/or (b) maintaining a compressive strength of the first panel 302 during the second vehicle impact event.

In some examples, at least some or all of the second cross-sectional area 500 is sized, shaped, structured, and/or otherwise configured such that the first neutral axis 617 extends through the first panel 302 at a point on the first panel 302 offset relative to a central area of the third portion 412 of the first panel 302. As shown in FIG. 6, the first neutral axis 617 is substantially perpendicular relative to the first surface 404 of the first panel 302. Further, the first neutral axis 617 is substantially offset relative to the central area of the third portion 412 of first panel 302.

According to the illustrated example of FIG. 6, the first rail 104 includes a first non-movable joint (e.g., one of a welded joint, a clinched joint, etc.) 618 coupling the first and second panels 302, 304 to the roof 108. The first joint 618 of FIG. 4 is at least partially formed and/or defined by the first and second panels 302, 304. Further, in some examples, the first joint 618 is formed and/or defined by one or more (e.g., all) of the first panel 302, the second panel 304, the cover 202, and/or the roof 108, as shown in FIG. 6. Although FIG. 6 depicts a single joint 618, in some examples, the first rail 104 is implemented differently, for example, using one or more other non-movable joints in addition or alternatively to the first joint 618 of FIG. 6. In such examples, the other non-movable joint(s) are distributed on the first panel 302 of the first pillar 106, for example, at least partially across the first segment 204 of the first pillar 106.

Figure 7:
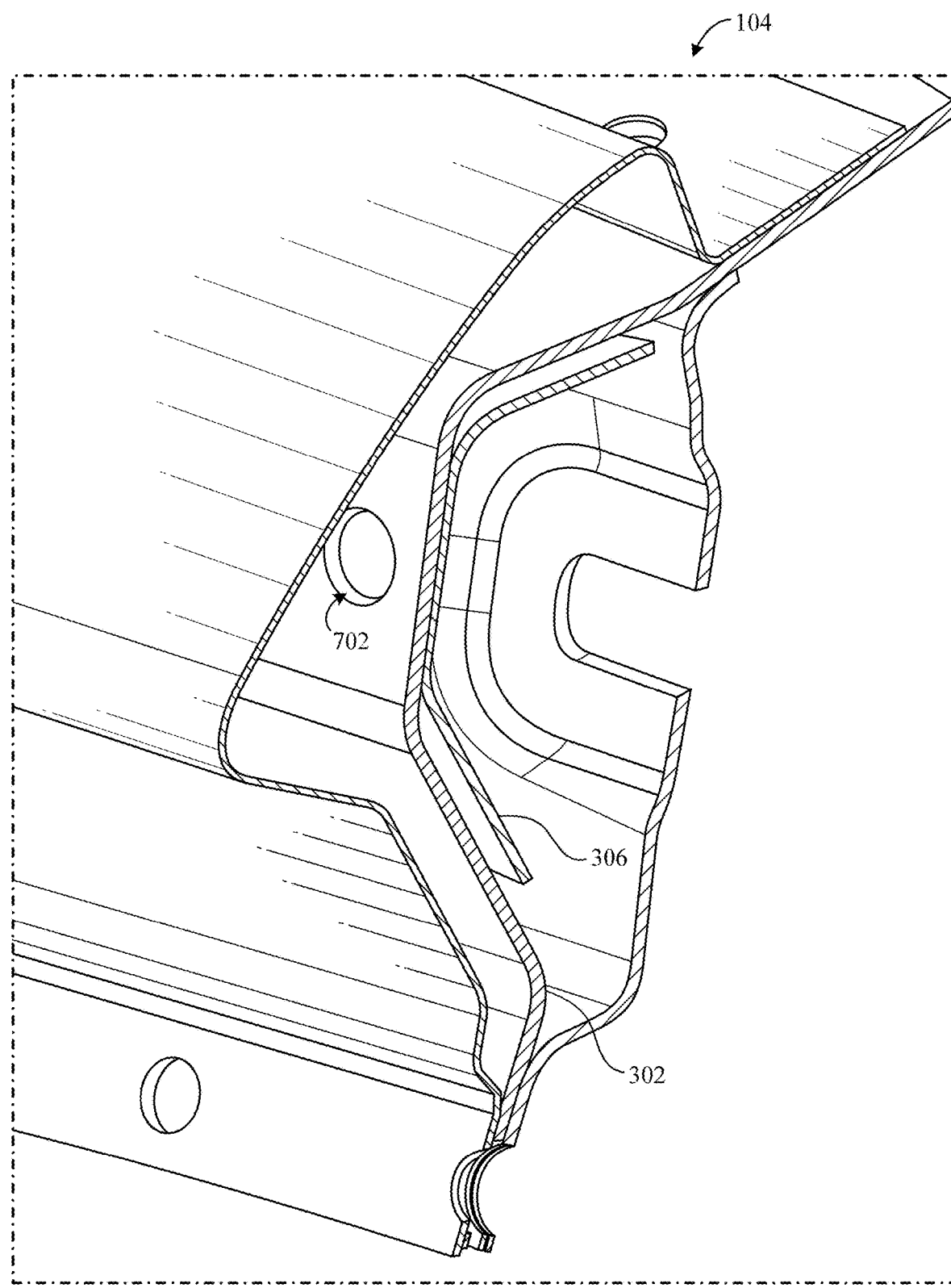
FIG. 7 is a cross-sectional view of the example rail of FIG. 2 along line C-C and shows a third cross-sectional area of the example rail corresponding to the segment of the example pillar of FIG. 2 in accordance with the teachings of this disclosure.

FIG. 7 is a cross-sectional view of the first rail 104 of FIG. 2 along line C-C and shows a third cross-sectional area 700 of the first rail 104 corresponding to the first segment 204 of the first pillar 106 in accordance with the teachings of this disclosure. The third cross-sectional area 700 of FIG. 7 is adjacent the second cross-sectional area 500 of FIGS. 5 and 6 such that the second cross-sectional area 500 is between the first and second cross-sectional areas 300, 500, for example, where the third cross-sectional area 700 is nearest relative to an end (e.g., topmost end) of the first pillar 106 compared to the first and second cross-sectional areas 300, 500. According to the illustrated example of FIG. 7, the first rail 104 includes a second non-movable joint (e.g., one of a welded joint, a clinched joint, etc.) 702 coupling the first and third panels 302, 306 together. The second joint 702 of FIG. 7 is at least partially formed and/or defined by the first panel 302 and/or the third panel 306. Although FIG. 7 depicts a single joint 702, in some examples, the first rail 104 is implemented differently, for example, using one or more other non-movable joints in addition or alternatively to the second joint 702 of FIG. 7. In such examples, the other joint(s) may be distributed on the first panel 302, for example, at least partially across the first segment 204 of the first pillar 106.

Figure 8:
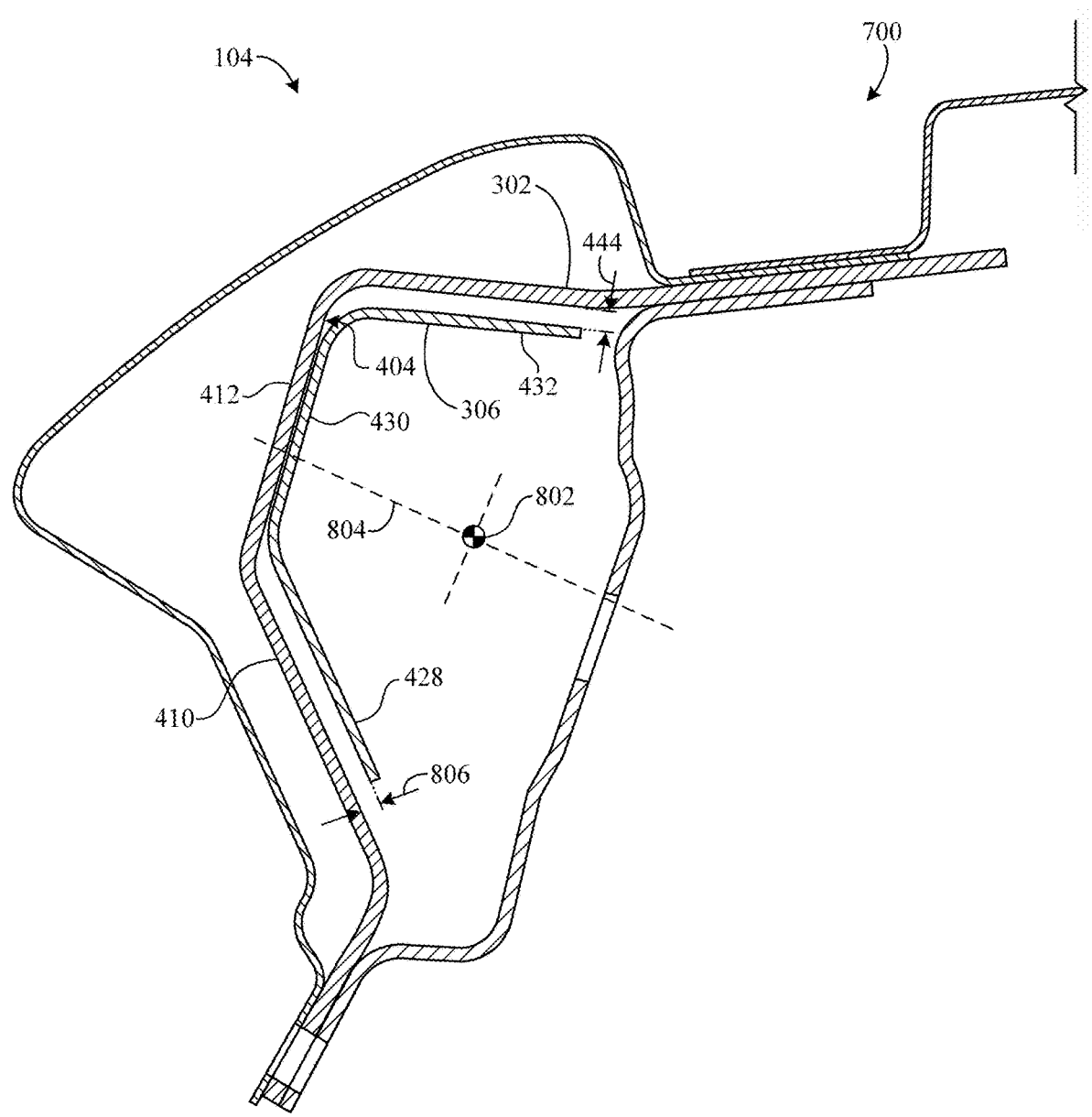
FIG. 8 is another cross-sectional view of the example rail of FIG. 2 along line C-C and shows the third cross-sectional area of the example rail.

FIG. 8 is another cross-sectional view of the first rail 104 of FIG. 2 along line C-C and shows the third cross-sectional area 700 of the first rail 104. According to the illustrated example of FIG. 8, at least a portion of the third cross-section area 700 of the first rail 104 is associated with a second centroid 802 and a second neutral axis 804 defined by, for example, one or more (e.g., all) of the first panel 302, the second panel 304, the third panel 306, and/or the cover 202. In some examples, the second centroid 802 and/or the second neutral axis 804 correspond to a vehicle pillar such as, for example, the first pillar 106. In such examples, the first pillar 106 also includes the second centroid 802 and/or the second neutral axis 804 such that the first panel 302 at least partially defines the second centroid 802 and/or the second neutral axis 804. In some examples, the second centroid 802 and/or the second neutral axis 804 of FIG. 8 is/are based on one or more parameters associated with the first rail 104 or the component(s) 302, 304, 306 thereof such as, for example, any of a size, a shape, a mass distribution, etc. Additionally, the second neutral axis 804 may be based on (a) the direction of the second load 130 or the component thereof and/or (b) the location on the vehicle body 102 at which the second load 130 or the component thereof is applied to. In particular, during the second vehicle impact event, a first portion of the first rail 104 below (in the orientation of FIG. 8) the second neutral axis 804 is loaded in compression in response to the first pillar 106 receiving second load 130. On the other hand, during the second vehicle impact event, a second portion of the first rail 104 above (in the orientation of FIG. 8) the second neutral axis 804 is loaded in tension in response to the first pillar 106 receiving the second load 130. As such, similar to the first neutral axis 617, the second neutral axis 804 is associated with an intermediate portion of the first rail 104 that is load in neither compression nor tension. In particular, each of the first portion 602 of the first structural feature 308, the second portion 604 of the first structural feature 308, and/or, more generally, the first structural feature 308 is positioned above (in the orientation of FIG. 8) the second neutral axis 804.

In some examples, at least some or all of the third cross-sectional area 700 is sized, shaped, structured, and/or otherwise configured such that the second neutral axis 804 extends through the central area of the third portion 412 of the first panel 302. As shown in FIG. 8, the second neutral axis 804 is substantially perpendicular relative to the first surface 404, similar to the first neutral axis 617. However, unlike the first neutral axis 617, the second neutral axis 804 of FIG. 8 is substantially centered relative of the third portion 412 of first panel 302. Further, in some examples, the first rail 104 is considered to be associated with a single neutral axis 617, 804, for example, that varies in shape or is uniformly-shaped along a partial length of first rail 104 corresponding to the first segment 204 of the first pillar 106. In such examples, the first structural feature 308 is positioned entirely above the single neutral axis 617, 804 associated with the first rail 104.

As shown in FIG. 8, the second portion 410 of the first panel 302 is spaced by a distance from the first portion 428 of the third panel 306 such that a fourth gap 806 is defined by and/or positioned between the second portion 410 of the first panel 302 and first portion 428 of the third panel 306. In some examples, during the first vehicle impact event, the first load 126 or the component thereof causes the second portion 410 of the first panel 302 to move toward the first portion 428 of the third panel 306, which closes at least a portion of the fourth gap 806. Then, the first portion 428 of the third panel 306 engages and/or abuts the second portion 410 of the first panel 302, thereby further resisting deformation of the first panel 302 and providing improved reinforcement to the first panel 302.

On the other hand, the first gap 442 does not exist in the third cross-sectional area 700 of the first rail 104. Instead, the third portion 412 of the first panel 302 of FIG. 8 is coupled to the second portion 430 of the third panel 306, for example, via one or more fasteners and/or one or more fastening methods or techniques (e.g., welding). In such examples, the third portion 412 of the first panel 302 and the second portion 430 of the third panel 306 provide an example primary weld location associated with the first rail 104. Further, the second gap 444 of FIG. 8 is maintained between and the fourth portion 424 of the first panel 302 and the third portion 432 of the third panel 306. As such, in some examples, prior to the first vehicle impact event, the second gap 444 is maintained and/or substantially uniform across the first rail 104 from the first cross-sectional area 300 to the third cross-sectional area 700.

Although FIGS. 3-8 depict a single structural feature 308, in some examples, the first pillar 106 is implemented differently, for example, using one or more other structural features (e.g., similar to the first structural feature 308) in addition or alternatively to the first structural feature 308 of FIGS. 3-8, which is discussed further below in connection with FIGS. 9-13, 15A, and 15B. Thus, although FIGS. 3-8 depict aspects in connection with the first structural feature 308, in some examples, such aspects likewise apply to the other structural feature(s) such as, for example, all of the multiple structural features 902, 904, 1104, 1202, 1514, 1516 of FIGS. 9-13, 15A, and 15B.

Figure 9:
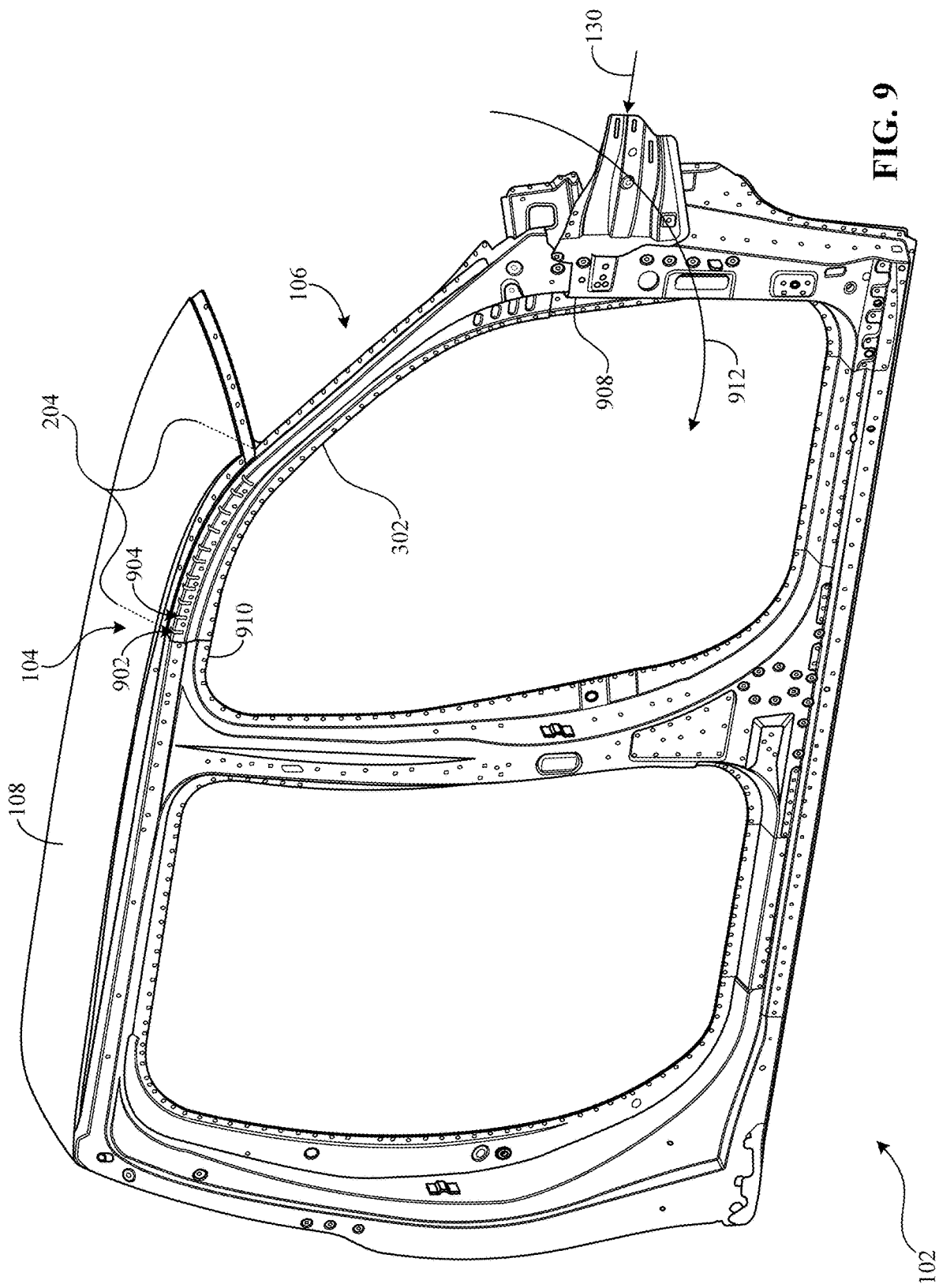
FIG. 9 is another detailed view of an example vehicle body in accordance with the teachings of this disclosure.

FIG. 9 is another detailed view of the vehicle body 102 of FIG. 1. According to the illustrated example of FIG. 9, the cover 202 has been removed from the vehicle body 102, for clarity. In some examples, to improve deformation control of the first panel 302 during the first vehicle impact event, the first pillar 106 of FIG. 9 includes multiple example structural features 308, 902 distributed on the first panel 302, eleven of which are shown in this example (i.e., a second structural feature 902, a third structural feature 904, etc.). The structural features 902, 904 are sometimes are referred to as weak spots or trigger points. In some example, the first structural feature 308 of FIGS. 3-8 corresponds to and/or is used to implement at least one of the multiple structural features 902, 904 of FIG. 9. The structural features 902, 904 of FIG. 9 can be implemented, for example, using one or more beads formed and/or defined by the first panel 302, similar to the first structural feature 308. In some examples, one or more (e.g., all) of the structural features 902, 904 is/are positioned on the first panel 302 in the first segment 204 of the first pillar 106. In particular, the structural features 902, 904 of FIG. 9 are sized, shaped, structured, and/or otherwise configured to reduce a compressive strength of the first segment 204 at points on the first panel 302 defined by respective ones of the structural features 902, 904, which facilitates providing the primary deformation mode of the first pillar 106 during the first vehicle impact event.

In some examples, the first panel 302 includes a first end that is coupled to a fourth example panel (e.g., a lower panel) 908. In such examples, the fourth panel 908 is a lower panel of the first pillar 106 such as, for example, an A-Pillar lower panel, which is sometimes referred to as an A-Pillar lower. In such examples, the first panel 302 and the fourth panel 908 at least partially overlap with each other, which provides a larger area in which fastener(s) for coupling the firs panel 302 and the fourth panel 908 together can be positioned. Further, in some examples, the fourth panel 908 is connected to a fifth example panel (e.g., a shear panel or an A-Pillar inner) (not shown) that is positioned behind or inboard relative to the fourth panel 908 and adjacent an engine bay of the vehicle 100. Additionally or alternatively, the fourth panel 908 of FIG. 9 is configured to connect to a hinge panel associated with a door hinge. As shown in FIG. 9, the first panel 302 extends away from the fourth panel 908 to receive, at or adjacent a second end 910 of the first pillar 106 opposite the first end 906, a part of the vehicle roof 108 and/or a panel of a different vehicle pillar. According to the illustrated example of FIG. 9, the first panel 302 is coupled to a panel of the fourth vehicle pillar 116 adjacent the second end 910 of the first pillar 106, for example, via one or more fasteners and/or one or more fastening methods or techniques.

In some examples, when the second load 130 or the component thereof is applied to the vehicle body 102, at least a portion of the second load 130 may be transmitted through the first panel 302 from the first end 906 of the first pillar 106 to the second end 910 of the first pillar 106. Additionally, as a result of such loading, a moment or torque 912 is applied to the first panel 302, for example, based on a direction and/or a magnitude associated with the second load 130.

Figure 10:
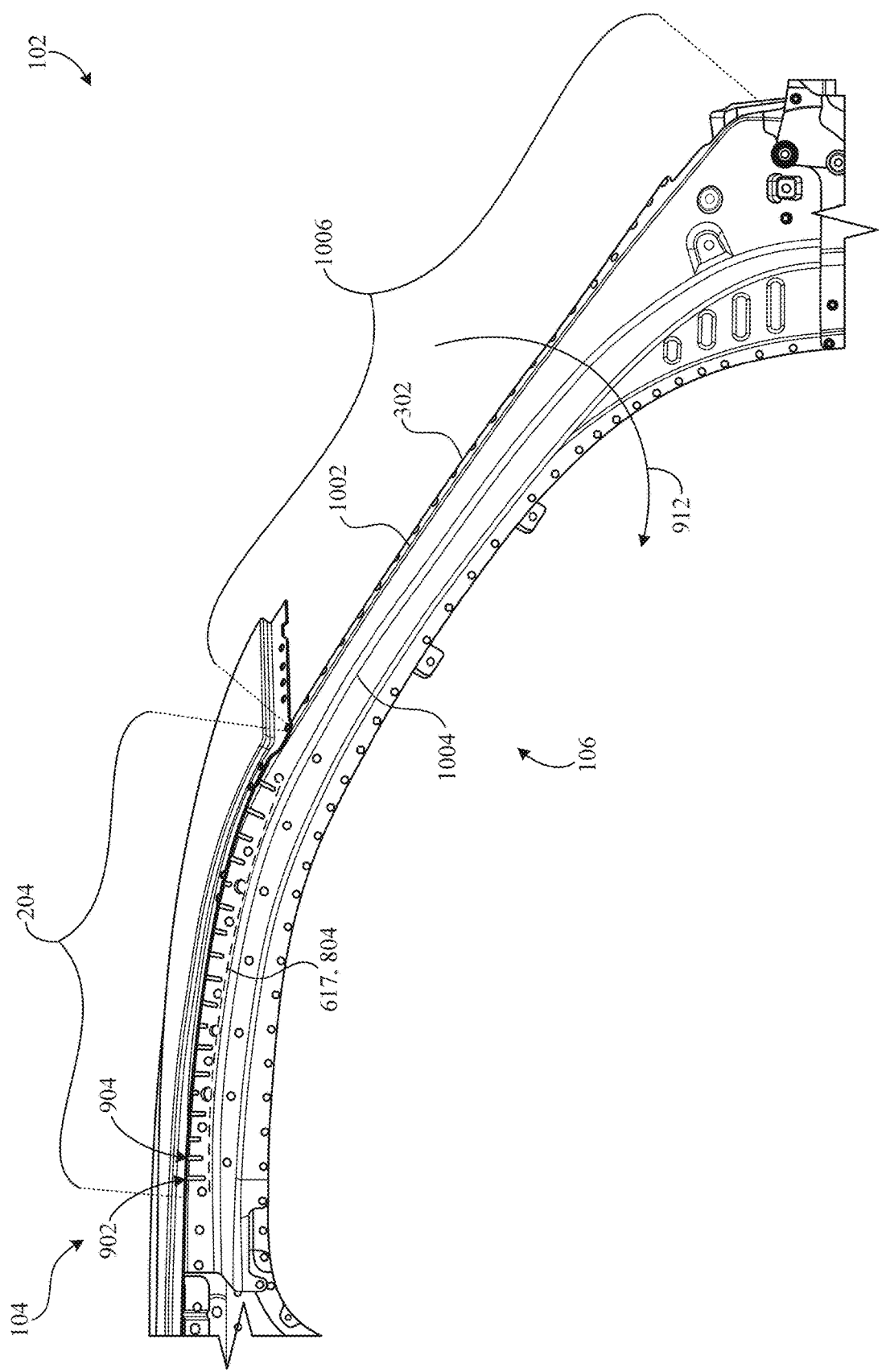
FIG. 10 is an enlarged portion-view of the example vehicle body of FIG. 9.

FIG. 10 is an enlarged portion-view of the vehicle body 102 of FIG. 9. The first pillar 106 of FIG. 10 is implemented using eighteen of the structural features 902, 904, which are distributed on the first panel 302 at least partially across the first segment 204 of the first pillar 106. In other words, the multiple structural features 902, 904 of FIG. 9 are distributed across a partial length of the first panel 302 (i.e., a length of the first panel 302 corresponding to the first segment 204). According to the illustrated example of FIG. 10, the first panel 302 includes a first ridgeline (e.g., a top ridgeline) 1002 and a second ridgeline (e.g., a bottom ridgeline) 1004 adjacent and/or below the first ridgeline 1002. The first and second ridgelines 1002, 1004 of FIG. 10 extend at least partially along the first panel 302, for example, from the first and 906 of the first pillar 106 to the second end 910 of the first pillar 106. In such examples, the third bend 424 of the first panel 302 provides and/or corresponds to the first ridgeline 1002, and the second bend 422 of the first panel 302 provides and/or corresponds to the second ridgeline 1004. In particular, the first ridgeline 1002 is positioned above the neutral axis 617, 804 (as represented by the dotted/dashed lines of FIG. 10) associated with the first rail 104. As such, the first ridgeline 1002 of FIG. 10 is loaded in tension during the second vehicle impact event. On the other hand, the second ridgeline 1004 is positioned below the neutral axis 617, 804. As such, the second ridgeline 1004 of FIG. 10 is loaded in compression during the second vehicle impact event.

In some examples, all of the multiple structural features 902, 904 are positioned on the first ridgeline (e.g., a top ridgeline) 1002 of the first panel 302, which ensures a sufficient load bearing capacity of the first pillar 106 is maintained during the second vehicle impact event. As shown in FIG. 10, the multiple structural features 902, 904 are distributed on the first ridgeline 1002 and substantially aligned relative to each other. In particular, all of the structural features 902, 904 of FIG. 10 are positioned above the neutral axis 617, 804 to prevent buckling of the first pillar 106 when the second load 130 is imparted on the first end 906 of the first pillar 106 during the second vehicle impact event. As previously mentioned, the torque 912 is generated by the second load 130 and applied to the first panel 302 when the second vehicle impact event occurs. In some examples, one or more (e.g., all) of the structural features 902, 904 is/are configured to expand (e.g., temporarily or permanently) in response to the first panel 302 receiving the torque 912 and/or the second load 130, for example, due to the tensile force(s) existing in the portion of first panel 302 above the neutral axis 617, 804. On the other hand, in such examples, the torque 912 does not cause any of the structural features 902, 904 to collapse due to the disclosed positioning of the structural features 902, 904 relative to the neutral axis 617, 804.

According to the illustrated example of FIG. 10, the first pillar 106 includes a second segment (e.g., a lower segment) 1006 coupled and/or connected to the first segment 204, which is sometimes referred to as a secondary portion of the first pillar 106. When the vehicle body 102 is assembled, the second segment 1006 of FIG. 10 extends away from the first segment 204 along the window 110, for example, to provide support to the window 110. In some examples, the second segment 1006 of the first pillar 106 further extends to the fourth panel 908 to receive the fourth panel 908. In particular, as shown in FIG. 10, none of the structural feature 902, 904 is positioned in the second segment 1006 of the first pillar 106. Although FIG. 10 depicts the structural features 902, 904 positioned only in the first segment 204, in some examples, the first pillar 106 is implemented differently. For example, some or all of the structural features 902, 904 may be distributed on a portion of the first panel 302 corresponding to the second segment 1006 of the first pillar 106.

FIG. 11 is a detailed view of the first panel 302 of the first pillar 106 and shows example spacing 1100 associated with at least some of the structural features 902, 904 in accordance with the teachings of this disclosure. According to the illustrated example of FIG. 11, the multiple structural features 902, 904 are evenly spaced from each other across the first segment 204 of the first pillar 106 (i.e., across a partial length of the first pillar 106). That is, in some examples, each of the structural features 902, 904 of FIG. 11 are spaced from one or two adjacent one(s) of the structural features 902, 904 by the same distance. For example, as shown in FIG. 11, the second structural feature 902 is spaced from the third structural feature 904 by a first distance 1102, the third structural feature 904 is spaced from a fourth structural feature 1104 by a second distance 1106, etc. In particular, in such examples, the distances 1102, 1106 between adjacent pairs of the structural features 902, 904, 1104 are substantially equal to each other, as shown in FIG. 11. The distances 1102, 1106 of FIG. 11 between the structural features 902, 904, 1104 of the first pillar 106 are based on, for example, centers or central areas of the respective structural features 902, 904, 1104. However, the distances 1102, 1106 of FIG. 11 can be defined by any other suitable portion(s) of the structural features 902, 904, 1104. Further, although FIG. 11 depicts the structural features 902, 904, 1104 of the first pillar 106 that are substantially evenly spaced relative to each other, in some examples, at least some or all of the structural features 902, 904, 1104 of the first pillar 106 are spaced unevenly relative to each other. In such examples, at least some or all of the distances 1102, 1106 between the structural features 902, 904, 1104 are different relative to the each other. In some examples, when the first rail 104 is assembled, each of the structural features 902, 904, 1104 of the first pillar 106 is interposed between a portion (e.g., the side 109) of the vehicle roof 108 and the cover 202.

FIG. 12 is an enlarged portion-view of the first panel 302 of FIG. 11 and shows a fifth structural feature 1202 in accordance with the teachings of this disclosure. In some examples, the fifth structural feature 1202 of FIG. 12 corresponds to and/or is used to implement one or more structural features of the first pillar 106 such as, for example, any one or more (e.g., all) of the first structural feature 308, the second structural feature 902, the third structural feature 904, the fourth structural feature 1104, etc. As shown in FIG. 12, the fifth structural feature 1202 is oblong and/or otherwise has a shape that is substantially oblong. According to the illustrated example of FIG. 12, the fifth structural feature 1202 extends transversely across the first ridgeline 1002. For example, as shown in FIG. 12, the fifth structural feature 1202 extends away from the first ridgeline 1002 in a first direction 1204 across a first distance 1206. Further, the fifth structural feature 1202 of FIG. 12 extends away from the first ridgeline 1002 in a second direction 1208, different relative to the first direction 1204, across a second distance 1209. In some examples, the second distance 1209 is greater than the first distance 1206. In particular, the second distance 1209 is predefined such that fifth structural feature 1202 remains above the neutral axis 617, 804 associated with the first rail 104. Stated differently, in some examples, the fifth structural feature 1202 has a first end 1210 positioned adjacent or proximate to a portion (e.g., the side 109) of the roof 108 and a second end 1211 opposite the first end 1210. Further, the fifth structural feature 1202 of FIG. 12 extends away from the side 109 of the roof 108 from the first end 1210 of the fifth structural feature 1202 to the second end of the 1211 of the fifth structural feature 1202.

According to the illustrated example of FIG. 12, the fifth structural feature 1202 has a width 1212. In some examples, the width 1212 of the fifth structural feature 1202 is defined by a first side 1214 of the fifth structural feature 1202 and a second side 1216 of the fifth structural feature 1202 facing the first side 1214. In such examples, the first side 1214 of the fifth structural feature 1202 is spaced from the second side 1216 of the fifth structural feature 1202 by a distance (e.g., substantially equal relative to the width 1212), for example, to provide a recessed area (e.g., a groove) 1217 positioned on the first surface 312 of the first panel 302. In some examples, when the first load 126 or the component thereof is applied to the first segment 204 of the first pillar 106 proximate to the fifth structural feature 1202, the fifth structural feature 1202 is configured to at least partially collapse such that the first and second sides 1214, 1216 of the fifth structural feature 1202 move toward each other and/or contact each other. Such a collapse of the fifth structural feature 1202 increases the bend radius associated with the first segment 204 that forms while the first segment 204 is bending during the first vehicle impact event. In such examples, the width 1212 of the fifth structural feature 1202 decreases. On other hand, in some examples, when the second load 130 or the component thereof is applied to the first end 906 of the first pillar 106 during the second vehicle impact event, the fifth structural feature 1202 is configured to at least partially expand such that the first and second sides 1214, 1216 of the fifth structural feature 1202 move away from each other and/or separate from each other. In such examples, the width 1212 of the fifth structural feature 1202 increases.

Although FIG. 12 depicts aspects in connection with the fifth structural feature 1202, in some examples, such aspects likewise apply to one or more other structural features of the first pillar 106 such as, for example, any one or more (e.g., all) of the first structural feature 308, the second structural feature 902, the third structural feature 904, the fourth structural feature 1104, etc.

Figure 13:
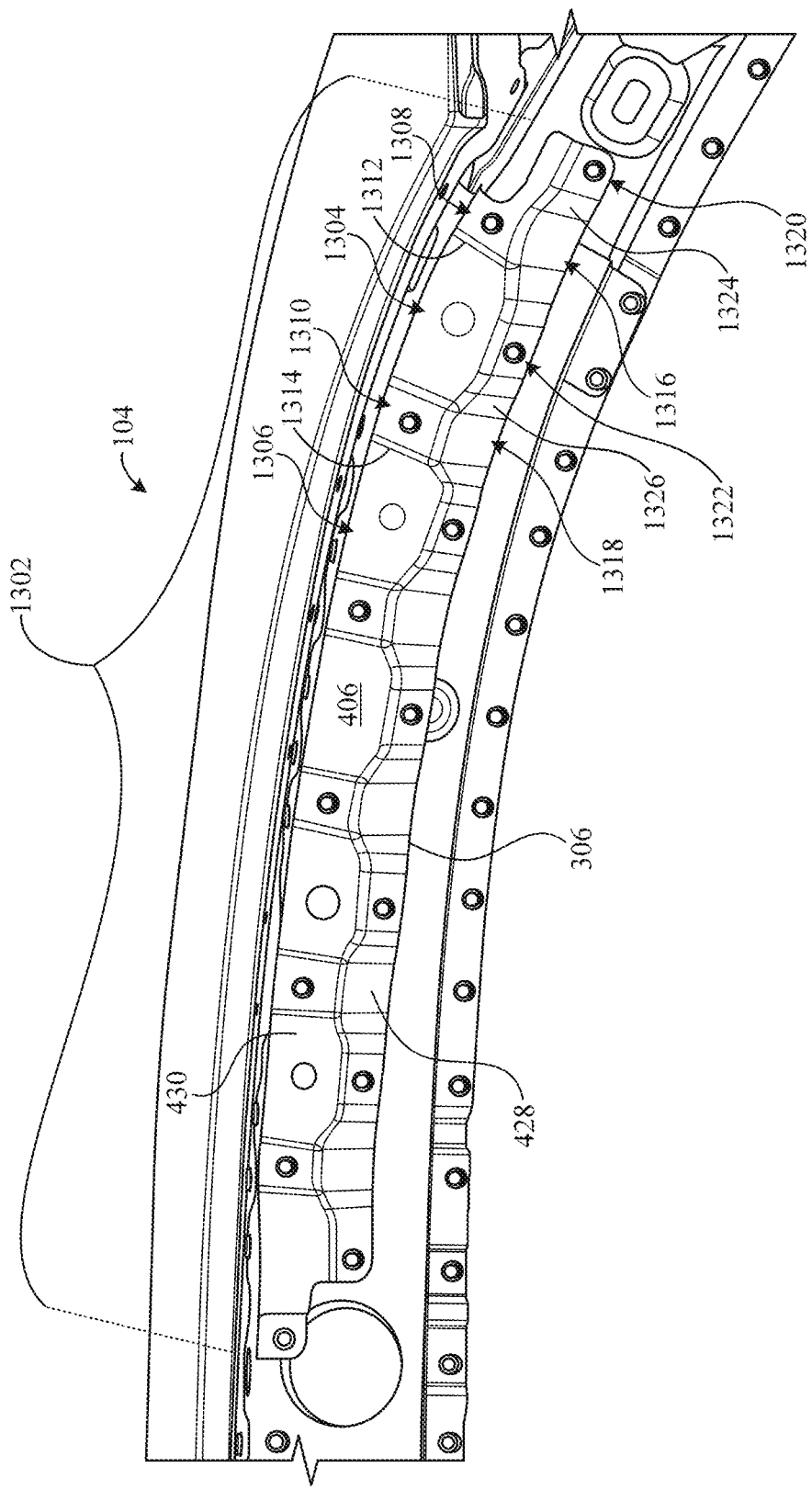
FIG. 13 is an enlarged portion-view of an example rail and shows an example segment thereof in accordance with the teachings of this disclosure.

FIG. 13 is an enlarged portion-view of the first rail 104 and shows a segment 1302 thereof in accordance with the teachings of this disclosure. According to the illustrated example of FIG. 13, the segment 1302 of the first rail 104 corresponds to and/or matches the first segment 204 of the first pillar 106. In such examples, the first segment 204 of the first pillar 106 and the segment 1302 of the first rail 104 are sometimes collectively referred to as a segment of interest 204, 1302 associated with the vehicle body 102. Further, the first panel 302 has been removed from the first rail 104 in the illustrated example of FIG. 13 to expose the third panel 306 of the first rail 104, for clarity. The third panel 306 of FIG. 13 is configured to extend along a partial length of the first panel 302, for example, across the first segment 204 of the first pillar 106 from a first one of the structural features 902, 904, 1104, 1202 to a last one of the structural features 902, 904, 1104, 1202.

In some examples, to accommodate the structural feature(s) 902, 904, 1104, 1202 prior to a vehicle impact event, the third panel 306 of FIG. 13 includes one or more primary recessed areas 1304, 1306 formed and/or defined by the first surface 406 of the third panel 306, six of which are shown in this example (i.e., a first primary recessed area 1304, a second primary recessed area 1306, etc.). The primary recessed area(s) 1304, 1306 are positioned on the second portion 430 of the third panel 306 and/or distributed on the second portion 430 of third panel 306 at least partially across a length of the third panel 306. When the first and third panels 302, 306 are assembled, the primary recessed area(s) 1304, 1306 of FIG. 13 and the second surface 404 of the first panel 302, together, are configured to provide the first space 402 and/or one or more other such spaces (e.g., similar to the first space 402) for containing structural feature(s). In particular, each of the primary recessed area(s) 1304, 1306 of FIG. 13 is sized, shaped, structured, and/or otherwise configured to receive one or more (e.g., three) of the structural features 902, 904, 1104, 1202 of the first pillar 106. In some examples, each of the primary recessed area(s) 1304, 1306 receives the same number of the structural features 902, 904, 1104, 1202 relative to each other. However, in some examples, at least some or all of the primary recessed area(s) 1304, 1306 receive a unique number of the structural features 902, 904, 1104, 1202.

In some examples, to facilitate coupling the first and third panels 302, 306 together, the third panel 306 of FIG. 13 also includes one or more primary weld locations 1308, 1310 associated with the first rail 104, seven of which are shown in this example (i.e., a first primary weld location 1308, a second primary weld location 1310, etc.). The primary weld location(s) 1308, 1310 are positioned on the second portion 430 of the third panel 306 and/or distributed on the second portion 430 of third panel 306 at least partially across the length of the third panel 306. The primary recessed area(s) 1304, 1306 are interposed between at least some of the weld location(s) 1308, 1310, as shown in FIG. 13. For example, the first primary weld location 1308 is positioned adjacent the first primary recessed area 1304. On the other hand, the second primary weld location 1310 is positioned between the first and second primary recessed areas 1304, 1306. Additionally, in some examples, to provide the primary weld location(s) 1308, 1310, the second portion 430 of the third panel 306 is formed with one or more primary protruding areas 1312, 1314, seven of which are shown in this example (i.e., a first primary protruding area 1312, a second primary protruding area 1314, etc.). For example, the primary protruding area(s) 1312, 1314 of FIG. 13 are formed and/or defined by the first surface 406 of the third panel 306. In such examples, each of the primary weld location(s) 1308, 1310 is positioned on a respective one of the primary protruding area(s) 1312, 1314. As shown in FIG. 13, the first primary weld location 1308 is centrally disposed on the first primary protruding area 1312, the second primary weld location 1308 is centrally disposed on the second primary protruding area 1314, etc. Each of the primary protruding area(s) 1312, 1314 of FIG. 13 extends away from a nearest one of the primary recessed area(s) 1304, 1306 to receive the third portion 412 of the first panel 302 and/or, more generally, the second surface 404 of the first panel 302.

Further, in some examples, to maintain a sufficient strength and/or rigidity of the third panel 306, the third panel 306 of FIG. 13 also includes one or more auxiliary recessed areas 1316, 1318 formed and/or defined by the first surface 406 of the third panel 306, six of which are shown in this example (i.e., a first auxiliary recessed area 1316, a second auxiliary recessed area 1318, etc.). The auxiliary recessed area(s) 1316, 1318 of FIG. 13 are positioned on the first portion 428 of the third panel 306 and/or distributed on the first portion 428 of third panel 306 at least partially across the length of the third panel 306. Additionally, in some examples, to further facilitate coupling the first and third panels 302, 306 together, the third panel 306 of FIG. 13 also includes one or more auxiliary weld locations 1320, 1322 associated with the first rail 104, seven of which are shown in this example (i.e., a first auxiliary weld location 1320, a second auxiliary weld location 1322, etc.). The auxiliary weld location(s) 1320, 1322 of FIG. 13 are positioned on the first portion 428 of the third panel 306 and/or distributed on the first portion 428 of third panel 306 at least partially across the length of the third panel 306. The auxiliary recessed area(s) 1316, 1318 are interposed between at least some of the auxiliary weld location(s) 1320, 1322, as shown in FIG. 13. For example, the first auxiliary weld location 1320 is positioned adjacent the first auxiliary recessed area 1316. On the other hand, the second auxiliary weld location 1322 is positioned between the first and second auxiliary recessed areas 1316, 1318.

Additionally, in some examples, to provide the auxiliary weld location(s) 1320, 1322, the first portion 428 of the third panel 306 is formed with one or more auxiliary protruding areas 1324, 1326, seven of which are shown in this example (i.e., a first auxiliary protruding area 1324, a second auxiliary protruding area 1326, etc.). For example, the auxiliary protruding area(s) 1324, 1326 of FIG. 13 are formed and/or defined by the first surface 406 of the third panel 306. In such examples, each of the auxiliary weld location(s) 1320, 1322 is positioned on a respective one of the auxiliary protruding area(s) 1324, 1326. As shown in FIG. 13, the first auxiliary weld location 1320 is centrally disposed on the first auxiliary protruding area 1324, the second auxiliary weld location 1322 is centrally disposed on the second auxiliary protruding area 1326, etc. Each of the auxiliary protruding area(s) 1324, 1326 of FIG. 13 extends away from a nearest one of the auxiliary recessed areas 1316, 1318 to receive the second portion 410 of the first panel 302 and/or, more generally, the second surface 404 of the first panel 302.

According to the illustrated example of FIG. 13, example welds (e.g., a spot weld) are formed on the first and third panels 302, 306 at each of the weld locations 1308, 1310, 1320, 1322, for example, when the first and third panels 302, 306 are assembled. In some examples, each of the primary and auxiliary weld locations 1308, 1310, 1320, 1322 is associated with a single one of the welds. In particular the weld(s) are configured to couple the first and third panels 302, 306 together.

Figure 14A:
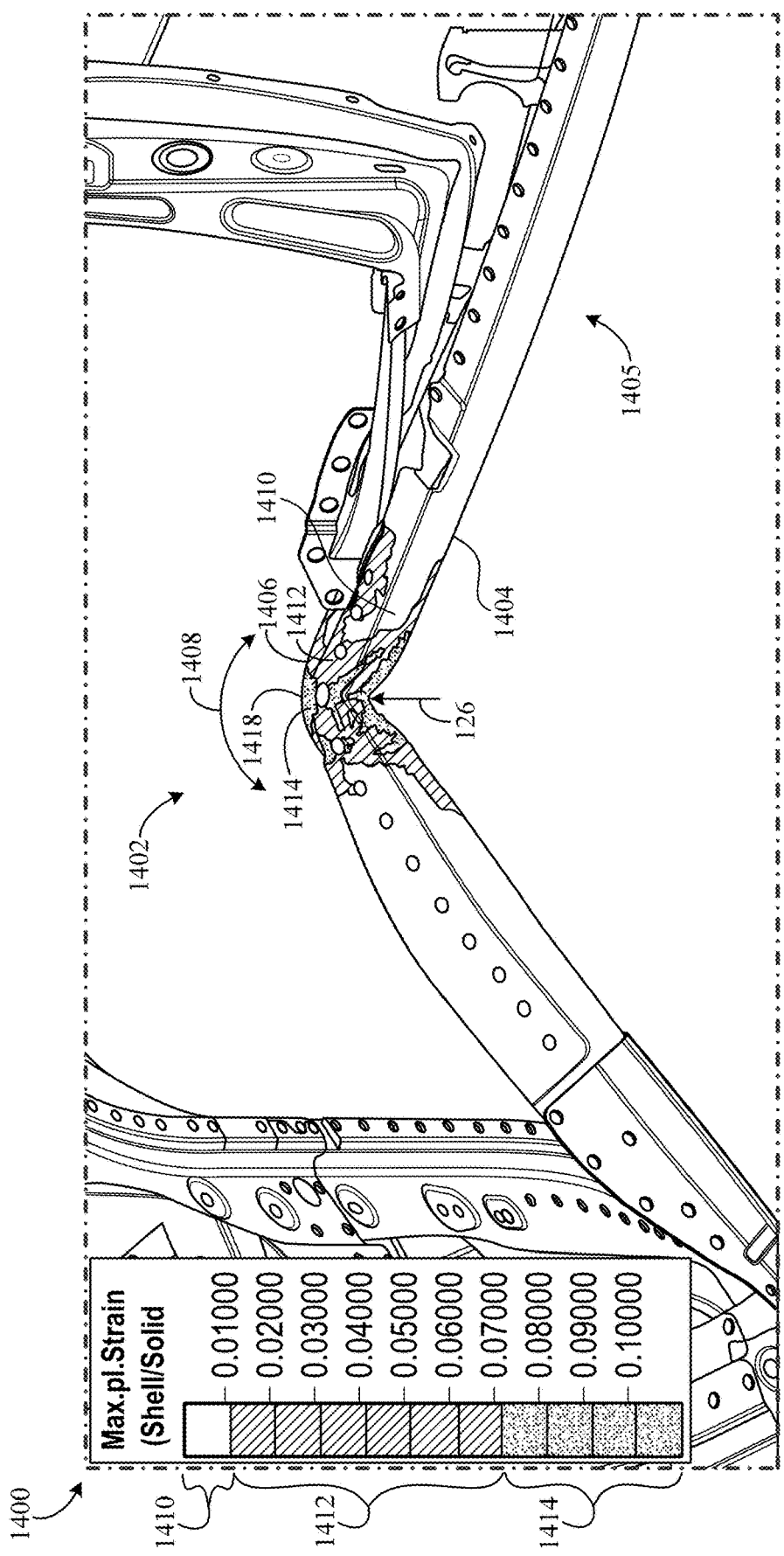
FIG. 14A is a strain map showing deformation associated with a different rail resulting from a vehicle impact event.

FIG. 14A is a first strain map 1400 showing deformation associated with a third vehicle rail 1402 resulting from a vehicle impact event. Unlike the first rail 104 and/or the second rail 134, none of the structural feature(s) 308, 902, 904, 1104, 1202 is implemented in the third vehicle rail 1402 or any panel (e.g., an A-Pillar outer) or portion associated with the third vehicle rail 1402. According to the illustrated example of FIG. 14A, the first load 126 or the portion thereof is applied to an A-Pillar outer panel 1404 of an A-Pillar 1405 coupled to the third vehicle rail 1402. In particular, the first load 126 or the component thereof causes all of the A-Pillar outer panel 1404, the A-Pillar 1405, and/or, more generally, the third vehicle rail 1402 to form a first bend (e.g., a small radius bend) 1406 thereon. Due to such bending, the A-Pillar outer panel 1404 transfers the first load 126 or the component thereof to a relatively small area of a rail inner panel of the third vehicle rail 1402, thereby imparting a relative high strain on the rail inner panel associated with tearing the rail inner panel. In such examples, the first bend 1406 formed as a result of the first vehicle impact event has a first radius 1408 (sometimes referred to as a first bend radius) that is substantially between 0.2 inches (in) and 0.4 in.

According to the illustrated example of FIG. 14A, the third vehicle rail 1402 and/or the A-Pillar 1405 have low strain areas 1410, medium strain areas 1412 (as represented by the cross-hatching of the FIG. 14A), and high strain areas 1414 (as represented by the dotted shading of FIG. 14A) associated therewith. The low strain areas 1410 of FIG. 14A correspond to strain values substantially above 0.07. Further, the medium strain areas 1412 of FIG. 14A correspond to strain values substantially between 0.01 and 0.07. Further still, the high strain areas 1414 of FIG. 14A correspond to strain values substantially less than 0.01. In particular, the A-Pillar outer panel 1404, the rail inner panel, and/or or, more generally, the third rail 1402 of FIG. 14A is/are highly strained due to the first load 126. For example, a maximum plane strain of the A-Pillar outer panel 1404 and/or the rail inner panel corresponding to a vertex 1418 of the first bend 1406 is substantially equal to or greater than 0.1. Further, as shown in FIG. 14A, a substantially large portion of the first bend 1406 corresponds to the high strain areas 1414.

Figure 14B:
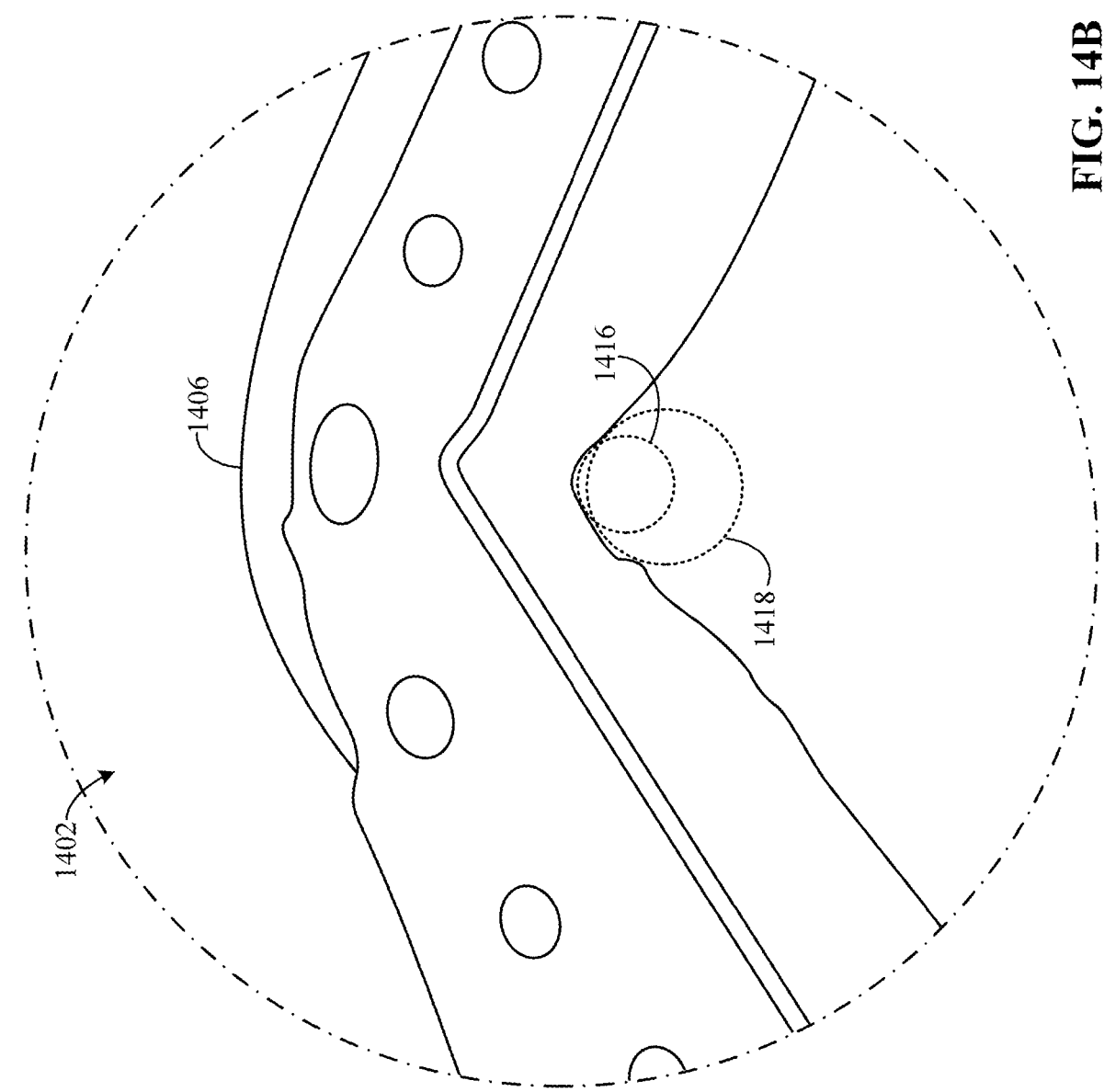
FIG. 14B is an enlarged portion view of the different rail of FIG. 14A.

FIG. 14B is an enlarged portion view of the third vehicle rail 1402 of FIG. 14A. As previously mentioned, the first bend 1406 may fall within a range of bend radii corresponding to a small radius bend. In some examples, the first bend 1406 includes a minimum potential radius (e.g., about 0.2 in) 1416 and a maximum potential radius (e.g., about 0.4 in) 1418, each of which corresponds to an inner portion of the first bend 1406.

Figure 15A:
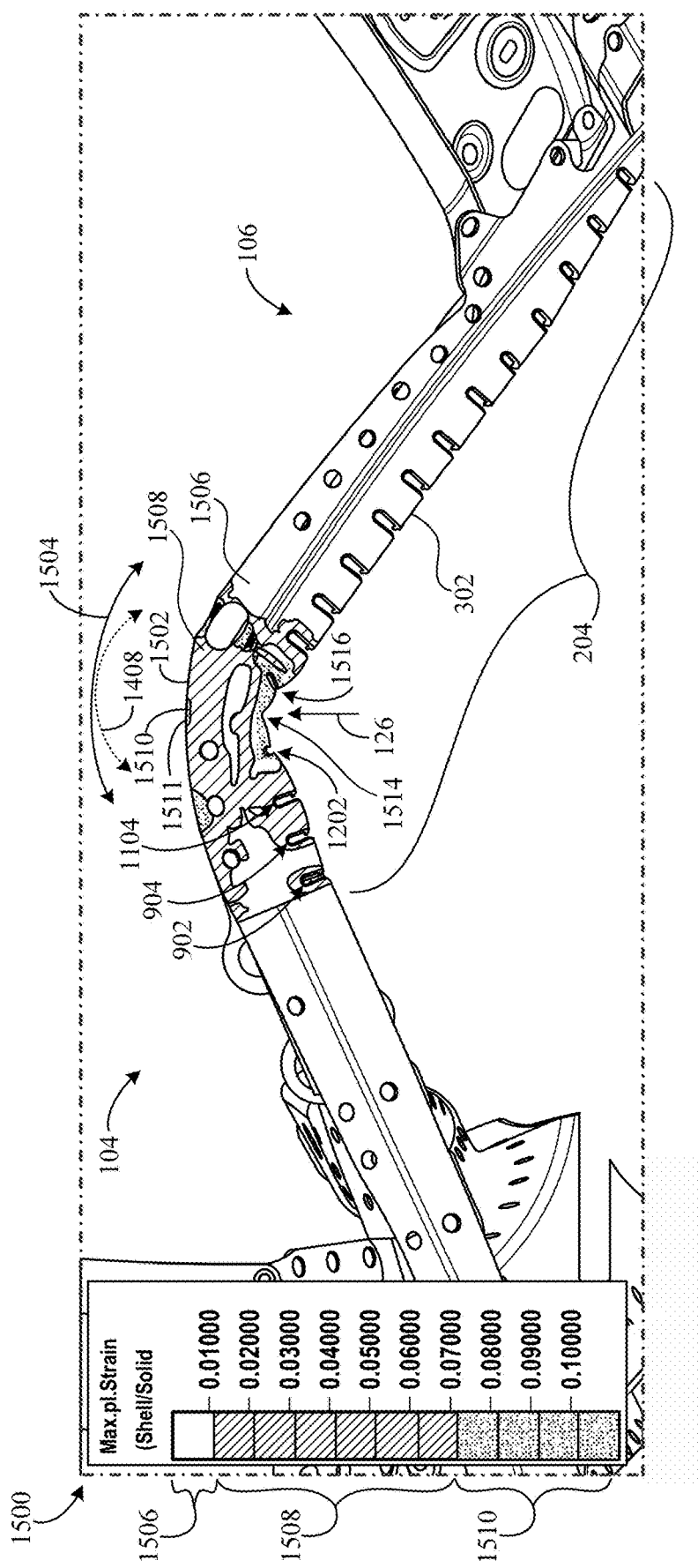
FIG. 15A is another strain map showing deformation associated with an example rail resulting from a vehicle impact event in accordance with the teachings of this disclosure.

FIG. 15A is a second strain map 1500 showing deformation associated with the first rail 104 resulting from the first vehicle impact event. Design parameters of the first rail 104 of FIG. 15A, such as panel thickness, are similar or comparable to corresponding design parameters of the third rail 1402. Unlike the third vehicle rail 1402 of FIGS. 14A and 14B, one or more (e.g., all) of the structural feature(s) 308, 902, 904, 1104, 1202 of the first pillar 106 are implemented in the first rail 104 and/or at least a portion (e.g., the first panel 302 of the first pillar 106) associated with the first rail 104. According to the illustrated example of FIG. 15A, the first load 126 or the portion thereof is applied to first panel 302 in the first segment 204 of the first pillar 106. The first load 126 or the component thereof, when applied, causes one or more (e.g., all) of the first panel 302, the first pillar 106, and/or the first vehicle rail 104 to begin to bend and/or deform relative to a point on the first rail 104 corresponding to the first load 126. In particular, at least one of the structural feature(s) 308, 902, 904, 1104, 1202 of FIG. 15A is configured to cause one or more (e.g., all) of the first panel 302, the first pillar 106, and/or, more generally, the first vehicle rail 104 to form a second bend (e.g., a substantially continuous, large radius bend that is controlled) 1502 in the first segment 204. Due to such bending facilitated by the structural feature(s) 308, 902, 904, 1104, 1202 of the first pillar 106, the first panel 302 of FIG. 15A transfers the first load 126 or the component thereof to a relatively large area (e.g., the impact area 314) of the second panel 304, thereby imparting a relatively low strain on the second panel 304 that is not associated with tearing second panel 304. In particular, the second bend 1502 associated with the first segment 204 effectively distributes at least a portion of the first load 126 onto the area of the second panel 304 to prevent the second panel 304 from tearing during the first vehicle impact event. Additionally, in such examples, the second bend 1502 formed as a result of the first vehicle impact event has a second radius 1504 (sometimes referred to as a second bend radius) that is substantially between 1.1 in and 1.9 in. As shown in FIG. 15A, the second bend radius 1504 is greater than the first bend radius 1408 (as represented by the dotted/dashed lines of FIG. 15A).

According to the illustrated example of FIG. 15A, the first rail 104 and/or the first pillar 106 have low strain areas 1506, medium strain areas 1508 (as represented by the cross-hatching of the FIG. 15A), and high strain areas 1510 (as represented by the dotted shading of FIG. 15A) associated therewith. The low strain areas 1506 of FIG. 15A correspond to strain values substantially above 0.07. Further, the medium strain areas 1508 of FIG. 15A correspond to strain values substantially between 0.01 and 0.07. Further still, the high strain areas 1510 of FIG. 15A correspond to strain values substantially less than 0.01. In particular, the first panel 302, the second panel 304, and/or or, more generally, the first rail 104 of FIG. 15A is/are not highly strained due to the first load 126 compared to the third rail 1402 of FIGS. 14A and 14B. For example, a maximum plane strain of the first panel 302 and/or the second panel 304 corresponding to a vertex 1511 of the second bend 1502 is substantially less than 0.1. Further, as shown in FIG. 15A, a substantially small portion of the second bend 1502 corresponds to the high strain areas 1510.

In some examples, two or more of the structural features 308, 902, 904, 1104, 1202 of FIG. 15A are configured to cause the first panel 302 to form the second bend 1502 when the first load 126 is applied to an area of the first panel 302 proximate to the two more of the structural features 308, 902, 904, 1104, 1202. For example, as shown in FIG. 15A, the first load 126 is applied to a first area of the first panel 302 proximate to the fifth structural feature 1202, a sixth structural feature 1514 of the first pillar 106, and a seventh structural feature 1516 of the first pillar 106. In such examples, each of the fifth structural feature 1202, the sixth structural feature 1514, and the seventh structural feature 1516 is configured to collapse while the first segment is bending (i.e., while the second bend 1502 is forming) to increase the second bend radius 1504 associated with the first segment 204 and, as a result, reduce the tensile stress associated with the second panel 304.

The second radius 1504 of the second bend 1502 is based on one or more parameters of at least one of the structural features 308, 902, 904, 1104, 1202, 1514, 1516 of the first pillar 106 such as, for example, a first one of the structural features 308, 902, 904, 1104, 1202, 1514, 1516 that is nearest relative to the first area to which the first load 126 is applied. In some examples where the fifth structural feature 1202 is nearest relative to the first area, the second bend radius 1504 is substantially based on one or more (e.g., all) (a) the width 1212 of the fifth structural feature 1202, (b) a depth of the fifth structural feature 1202, (c) a length of the fifth structural feature 1202, (d) etc., (e) any other suitable parameter(s) of the fifths structural feature 1202, and/or (f) a combination thereof (e.g., at least some or all of the (a), (b), (c), (d), and/or (e)).

Figure 15B:
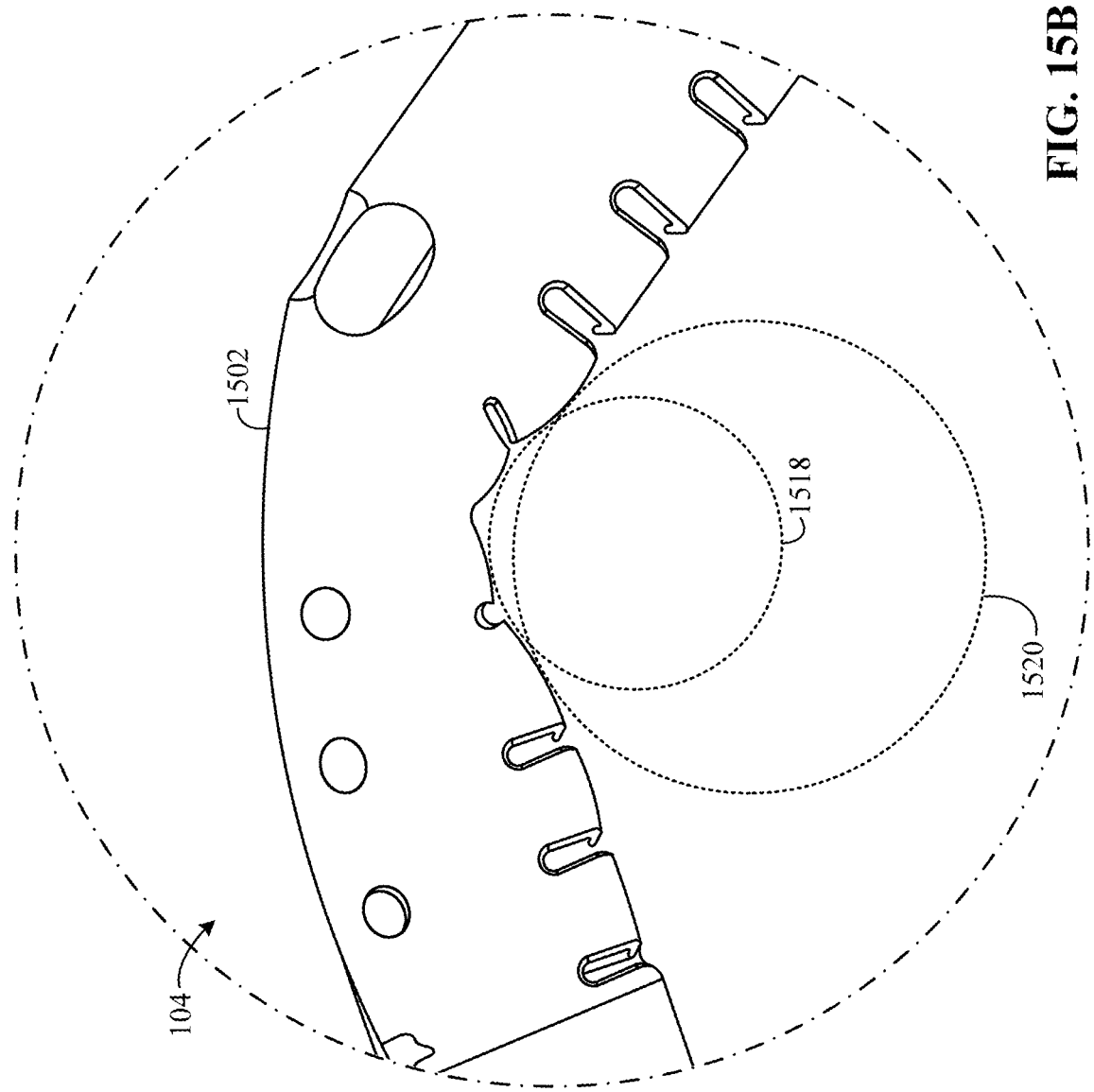
FIG. 15B is enlarged portion view of the example rail of FIG. 15A.

FIG. 15B is an enlarged portion view of the first rail 104 of FIG. 15A. As previously mentioned, the second bend 1502 may fall within a range of bend radii corresponding to a large radius bend. In some examples, the second bend 1502 includes a minimum potential radius (e.g., about 1.1 in) 1518 and a maximum potential radius (e.g., about 1.9 in) 1520, each of which corresponds to an inner portion of the second bend 1502.

Although FIGS. 3-13, 15A, and 15B depict aspects in connection with the first pillar 106, in some examples, such aspects likewise apply to one or more other end pillars of a vehicle in addition or alternatively to the first pillar 106 such as, for example, the second vehicle pillar 112 and/or the third vehicle pillar 114. Accordingly, although FIGS. 3-13, 15A, and 15B depict the structural feature(s) 308, 902, 904, 1104, 1202, 1514, 1516 implemented in the first pillar 106, in some examples, the other end pillar(s) 112, 114 are likewise implemented using one or more of the structural feature(s) 308, 902, 904, 1104, 1202, 1514, 1516 in addition or alternatively to the first pillar 106. In some such examples, the second vehicle pillar 112 includes a panel (e.g., outer panel such as an A-Pillar outer) and at least some or all of the structural feature(s) 308, 902, 904, 1104, 1202, 1514, 1516 distributed on the panel.

As used herein, the terms "Including" and "comprising" (and all forms and tenses thereof) are to be open ended terms. Thus, whenever a claim employs any form of "include" or "comprise" (e.g., comprises, includes, comprising, including, has, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended.

It will be appreciated that the systems, apparatus, and methods disclosed in the foregoing description provide numerous advantages. Examples disclosed herein provide an example vehicle pillar including one or more structural features configured to particularly control deformation of the pillar during a vehicle impact event to prevent a panel of a vehicle rail from tearing. Disclosed examples improve vehicle safety while substantially reducing part costs and/or complexity typically associated with vehicle pillars.

Although certain example systems, apparatus, and methods have been disclosed herein, the scope of coverage of this patent is not limited thereto. Obviously, numerous modifications and variations are possible in light of the above teachings. It is therefore to be understood that within the scope of the appended claims, the invention may be practiced otherwise than as specifically described herein.

Thus, the foregoing discussion discloses and describes merely exemplary embodiments of the present invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernible variants of the teachings herein, defines, in part, the scope of the foregoing claim terminology such that no inventive subject matter is dedicated to the public.

What is claimed is:

1. A vehicle, comprising:
   a roof;
   a roof side rail including an inner panel that extends along a side of the roof; and
   a pillar including an outer panel that extends along the side of the roof and is coupled between the roof and the inner panel, the pillar including a structural feature positioned on the outer panel, the structural feature configured to cause the outer panel to form a bend that distributes a first load onto an area of the inner panel to prevent the inner panel from tearing during a first vehicle impact event in which the first load is imparted on the outer panel,
   wherein the roof side rail includes a reinforcing panel coupled to the outer panel and positioned between the outer panel and the inner panel, and
   wherein the structural feature formed on the outer panel extends into a gap formed between the outer panel and the reinforcing panel.

2. The vehicle of claim 1, wherein the pillar is an A-Pillar.

3. The vehicle of claim 1, wherein the pillar includes multiple structural features positioned on the outer panel, two or more of the multiple structural features configured to cause the outer panel to form the bend when the first load is applied to an area of the outer panel proximate to the two more of the multiple structural features.

4. The vehicle of claim 3, wherein:
the pillar includes a neutral axis at least partially defined by the outer panel, and
all of the multiple structural features are positioned above the neutral axis to prevent buckling of the pillar when a second load, different relative to the first load, is imparted on an end of the pillar during a second vehicle impact event different from the first vehicle impact event.

5. The vehicle of claim 3, wherein each of the structural features is positioned on a top ridgeline of the outer panel.

6. The vehicle of claim 3, wherein the multiple structural features are distributed across a partial length of the outer panel and evenly spaced from each other.

7. The vehicle of claim 3, wherein each of the multiple structural features is interposed between the roof and a cover of a vehicle body.

8. The vehicle of claim 3, wherein each of the multiple structural features is positioned in a segment of the pillar overlapping with the roof.

9. The vehicle of claim 1, wherein a radius of the bend is based on one or more parameters of the structural feature.

10. The vehicle of claim 1, wherein the structural feature includes a bead formed by one or more surfaces of the outer panel.

11. The vehicle of claim 1, wherein the structural feature is positioned on a first portion of the outer panel and a second portion of the outer panel angled relative to the first portion.

12. The vehicle of claim 1, wherein the structural feature includes a recessed area extending at least partially into the outer panel and a protruding area positioned on the outer panel opposite relative to the recessed area.

13. The vehicle of claim 1, wherein the structural feature is oblong and extends away from the vehicle roof from a first end of the structural feature proximate to the vehicle roof to a second end of the structural feature opposite the first end.

14. The vehicle of claim 1, wherein the reinforcing panel includes weld locations distributed on a portion of the reinforcing panel and recessed areas interposed between the weld locations, the structural feature extending at least partially into one of the recessed areas.

15. A pillar for a vehicle, comprising:
a first segment partially forming a roof side rail of the vehicle that is configured to provide support to a vehicle roof, the first segment configured to bend when a first load is applied to the first segment during a first vehicle impact event;
a second segment connected to the first segment and extending away from the first segment along a window of the vehicle; and
a structural feature positioned in the first segment, the structural feature configured to collapse while the first segment is bending to increase a bend radius associated with the first segment,
wherein the roof side rail includes a reinforcing panel coupled to the first segment and positioned between the first segment and the second segment, and
wherein the structural feature formed on the first segment extends into a gap formed between the first segment and the reinforcing panel.

16. The pillar of claim 15, further including multiple structural features positioned in the first segment, two or more of the structural features configured to collapse to increase the bend radius of the first segment while the first segment is bending.

17. The pillar of claim 16, wherein the pillar includes a panel having a top ridgeline and a bottom ridgeline adjacent the top ridgeline, the multiple structural features distributed on the top ridgeline.

18. The pillar of claim 15, wherein all of the multiple structural features are positioned above a neutral axis of the pillar to prevent buckling of a panel of the pillar when a second load, different relative to the first load, is imparted on an end of the pillar during a second vehicle impact event different from the first vehicle impact event.

* * * * *